(12) United States Patent
Peikes

(10) Patent No.: US 7,096,420 B1
(45) Date of Patent: Aug. 22, 2006

(54) METHOD AND SYSTEM FOR AUTOMATICALLY DOCUMENTING SYSTEM COMMAND FILE TAGS AND GENERATING SKELETON DOCUMENTATION CONTENT THEREFROM

(75) Inventor: Wendy Peikes, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 656 days.

(21) Appl. No.: 09/838,956

(22) Filed: Apr. 19, 2001

Related U.S. Application Data

(63) Continuation-in-part of application No. 09/796,865, filed on Feb. 28, 2001.

(51) Int. Cl.
*G06F 15/00* (2006.01)
*G06F 17/00* (2006.01)
*G06F 17/21* (2006.01)
*G06F 17/24* (2006.01)

(52) U.S. Cl. .................. 715/513; 715/522; 715/514

(58) Field of Classification Search ........... 715/513, 715/514, 522
See application file for complete search history.

(56) References Cited

U.S. PATENT DOCUMENTS

| | | | | |
|---|---|---|---|---|
| 5,893,916 | A | * | 4/1999 | Dooley .................. 715/523 |
| 6,006,242 | A | * | 12/1999 | Poole et al. ............. 715/531 |
| 6,721,713 | B1 | * | 4/2004 | Guheen et al. .......... 705/1 |
| 6,721,727 | B1 | * | 4/2004 | Chau et al. ............. 707/3 |

OTHER PUBLICATIONS

Husain, Kamran, et al. Red Hat Linux Unleashed; 1996; Sams Publishing; First Edition; pp. 90-91.*

* cited by examiner

*Primary Examiner*—Doug Hutton
*Assistant Examiner*—N Hillery

(57) ABSTRACT

A method for generating documentation content for computer operating system commands with command specifications in command definition files is disclosed. The method includes examining a command definition file for a syntactic structure of a corresponding command. The command definition file has a link point, a keyword, and an argument. A documentation requirement and documentation options are extracted from the syntactic structure. The documentation requirement and the documentation options are combined into a documentation tag construct. The method automatically generates a template for a documentation content file, which includes a natural language explanation for the keyword and argument.

19 Claims, 18 Drawing Sheets

601

REQUIRED TAGS after 'help' for Keywords and Arguments keyword: <kwdName>,help:"xxx", doc:"kwd_descrip";

string:->arg(<#)>, help: "sss", doc:"arg_name, arg_descrip, arg_default";

interface:->arg(<#>), help:"iii",doc:"arg_name,arg_descrip,arg_default";

number:range:<#-#>,->arg(<#>),help:"nnn",doc:"arg_name,arg_descrip.."

602

OPTIONAL & REQUIRED TAGS in Document Collection Added before endofcmd doc-collection:"purpose,cmd_default,cmd_history,usage,example,related_cmds";
endofcmd: ...

603

EXEMPLARY OPTIONAL DOC TAGS with Values from Doc Content File command_default: "the default behavior is to turn logging off"

cmd_history(v1):"First introduced in release 11.1"

examples(v1): "Following is sample usage of and output from the 'show disk space' command:
>show disc space<filesystem1>Filesystemtotal-memory used unused
<filesystem1> 300M 50M 250M"

Fig. 6

CmdX documentation tag format:

<doc_tag_name>(v<variant-#>,<arg-#>):"<doc_tag_value>"

Exemplary CmdX Dog-Tags:

arg_name(v1, 3):"number of seconds to delay"
kwd_descrip(v2,format):"format a disk"
usage(v3):"This command is used to clear the cache"

Fig. 7 flash_fsck.cmd

```
chainname: exec_flash_fsck;
chainpoint: "exec";
linkpoint:  "";
privilage:  root;

/*
*fsck
keyword:    fsck,
  help: "File system check for flash devices";

keyword:    nocrc,
  help: "Crc check not required";

string:
    -> arg(1),
  help:  "Name of flash Device";

endofcommand;
```

Fig. 8A flash_fsck_dt.cmd

```
chainname:  exec_flash_fsck;
chainpoint: "exec";
linkpoint:  "";
privilege:  root;

/*
*fsck
*/
keyword:   fsck,
   help: "File system check for flash devices",
   doc: "kwd_descrip";

keyword:   nocrc,
   help: "Crc check not required",
   doc: "kwd_descrip";

string:
   -> arg(1),
   help:  "Name of Flash Device",
   doc:   "arg_name,arg_descrip,arg_default";

doc_collection:
"purpose,cmd_default,cmd_history,usage,example,related_cmds";

endofcommand;
```

Fig. 8B flash_fsck_dt.cmdX

```
kwd_descrip(v1, fsck: "File system check for flash devices",
kwd_descrip(v1), nocrc): "Crc check not required", arg_name(v1, 1):"<flash_device_name>"
arg_descrip(v1, 1):"Name of Flash Device"
arg_default:(v1, 1):""

purpose(v1):"to perform the <'fsck'> operation
  on the router nocrc information,
  use the <fsck nocrc> EXEC command."

cmd_default(v1):""
cmd_history(v1):"This command first appeared in Cisco IOS Release 1.0"
usage(v1):""

example(v1):"The following example shows the operation of the
  <fsck nocrc> EXEC command
  <fsck nocrc<flash_device_name>> related_cmds(v1):""
```

Fig. 8C

METHOD AND SYSTEM FOR AUTOMATICALLY DOCUMENTING SYSTEM COMMAND FILE TAGS AND GENERATING SKELETON DOCUMENTATION CONTENT THEREFROM

RELATED UNITED STATES APPLICATION

This patent application is a continuation-in-part of co-pending U.S. patent application Ser. No. 09/796,865, filed on Feb. 28, 2001, and entitled "Method and System for Generating Documentation from Operating System Command Syntax", by Wendy Peikes, et al., and assigned to the assignee of the present invention, which is incorporated herein by reference.

BACKGROUND OF THE INVENTION

1. Technical Field of the Invention

The present invention relates to the field of computer software such as operating systems and their Command Line Interfaces. More specifically, the present invention relates to a method, system, and computer usable medium for automatically documenting command file tags and for generating skeleton documentation content from operating system command files.

2. Related Art

Computer systems function, on one level, through the action of software implementing an operating system. An operating system controls the physical operation of the computer, e.g., electronic processes of the computer's subsystems and components implementing the function of the computer system. Operating systems are sometimes updated, revised, modified, improved, and enhanced. Such changes are incorporated through implementing new versions, e.g., releases of the operating system, and typically, loading the new releases onto a computer system, as they become available.

Operating system functionality is characterized and utilized, in one sense, by a list of commands which enable the operating system to control computer system function in accordance with a programmer's intent. These commands are specified and implemented via what is called the operating system's Command Line Interface.

All operating systems deploy a Command Line Interface through one modality or another. The Command Line Interface (CLI) provides the capability of non-programmatically, interactively accessing and controlling the computer system.

Commands are often grouped together in command files. Commands and command files may be changed, added, deleted, modified, substituted, or augmented with each release. Often, as operating system software develops, the list of commands and command files may grow quite large and become very complex. Using, for example, Cisco Systems' Internetworking Operating System™ (IOS™), an operating system enabling the functionality of routers, e.g., computer systems specializing in internetwork routing, there are approximately 2,000 active commands presently extant at this writing; the number growing still. Each IOS release arrives with new and syntax-enhanced commands.

The documentation of each and every command and command file, including any and all changes, is a crucial responsibility, often shared or tasked between software engineering and technical writing, who may, as a team build webpages and other documents with command functionality as content. There has conventionally been no methodology for software engineers to provide command functionality details and updates to technical writers and other documentation team members. In the conventional art, documentation is an ad hoc process, performed manually.

Documentation has at least two levels, a first wherein documentation is added at a base level to command files by operating system engineers and technical writers, and a second wherein high level documentation is generated for end users in some transparent, user accessible format, e.g., webpages. Localization to languages other than English, especially in generating high level documentation, is often crucial to product implementation, applicability, and marketability. Conventionally, documentation has been, and by ad hoc consortium of operating system engineers, technical writers, and others.

Conventional solutions, even using automated documentation technologies, are tedious. This, coupled with its ad hoc nature, causes errors, confusion, and conflict. Vigilance must be practiced to prevent syntax errors in generating command files and failure to incorporate required documentation content items. Further, there are risks of accidental user data destruction, of wiping out existing command definition and/or command documentation files, and misplacement of generated documentation files. Attempts at localization to languages other than English exacerbate these challenges, and the conventional art does not systematically promote such localization. Documentation at the base level, does not support generation of documentation at the higher level for end users. Documentation syntax often suboptimally represents actual documentation contents. Format typically suffers; existing products often reveal varying degrees of conformity with conventions of structural formality necessary for optimal system transparency and performance.

Thus, the conventional art is problematic because documentation performed in accordance with its regime is tedious, disjointed, and prone to error, omission and inadvertent data destruction. Conventional documentation is also problematic because it does not systematically support either localization to languages other than English or higher level documentation. Further, conventional documentation is problematic because documentation syntax does not optimally represent actual documentation contents, and existing documentation may not adequately conform to structural standards.

Accordingly, what is needed is a method and/or system of documentation that promotes uniformity, minimizes error, omission, and data destruction, and is not tedious. What is also needed is a method and/or system of documentation that systematically supports both localization to languages other than English and higher level documentation. Further, what is needed is a method and/or system of documentation wherein documentation syntax optimally represents actual documentation contents, and documentation produced conforms adequately with structural standards.

SUMMARY OF THE INVENTION

The present invention provides a method and system of documentation that promotes uniformity, minimizes error, omission, and data destruction, and is not tedious. In one embodiment, automated generation of documentation tags is simple to use and saves users from the tedium of editing command definition files and adding command documentation content. Advantageously, this avoids errors and omission. Uniformity results from documentation rising from an ad hoc process to one that is systematic, coordinated, and harmonized. In one embodiment, existing synonymous command definition files and command documentation content files are preserved, and user data is protected during generation of new documentation file names.

The present invention provides a method and system of documentation that systematically supports both localization to languages other than English and higher level documentation. In one embodiment, separation of command documentation information from command definition files promotes localization to languages other than English. Only certain documentation contents, rather than entire commands, require translation, advantageously promoting stability along with linguistic localization. In one embodiment, documentation content automatically generated is efficiently converted to HyperText Markup Language (HTML), and produces reasonable web page content, advantageously promoting high level documentation.

The present invention provides a method and system of documentation wherein documentation syntax optimally represents actual documentation contents, and documentation produced conforms adequately with structural standards. In one embodiment, English-like syntax of certain documentation content provides a clear model of actual content. In one embodiment, automatically generated and formatted templates provide a standard framework may be replaced with precise documentation content and data that may be applied in documentation generation. In the present embodiment, overriding automatically generated skeletal documentation values with desired real values is a simple engineering task. Further, automatically generated documentation appears in the same directory in obvious places, advantageously rendering the present embodiment intuitively simple.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 6 is a table of required and optional keyword and argument, required command purpose and usage, and exemplary optional command documentation tags, in accordance with one embodiment of the present invention.

FIG. 7 is a table of format and corresponding documentation tags, in accordance with one embodiment of the present invention.

FIG. 8A is a block diagram depicting an exemplary command definition file, in accordance with one embodiment of the present invention.

FIG. 8B is a block diagram depicting an exemplary command definition file with embedded documentation tags, in accordance with one embodiment of the present invention.

FIG. 8C is a block diagram depicting an exemplary documentation tag file, in accordance with one embodiment of the present invention.

DETAILED DESCRIPTION OF THE INVENTION

Figure 1:
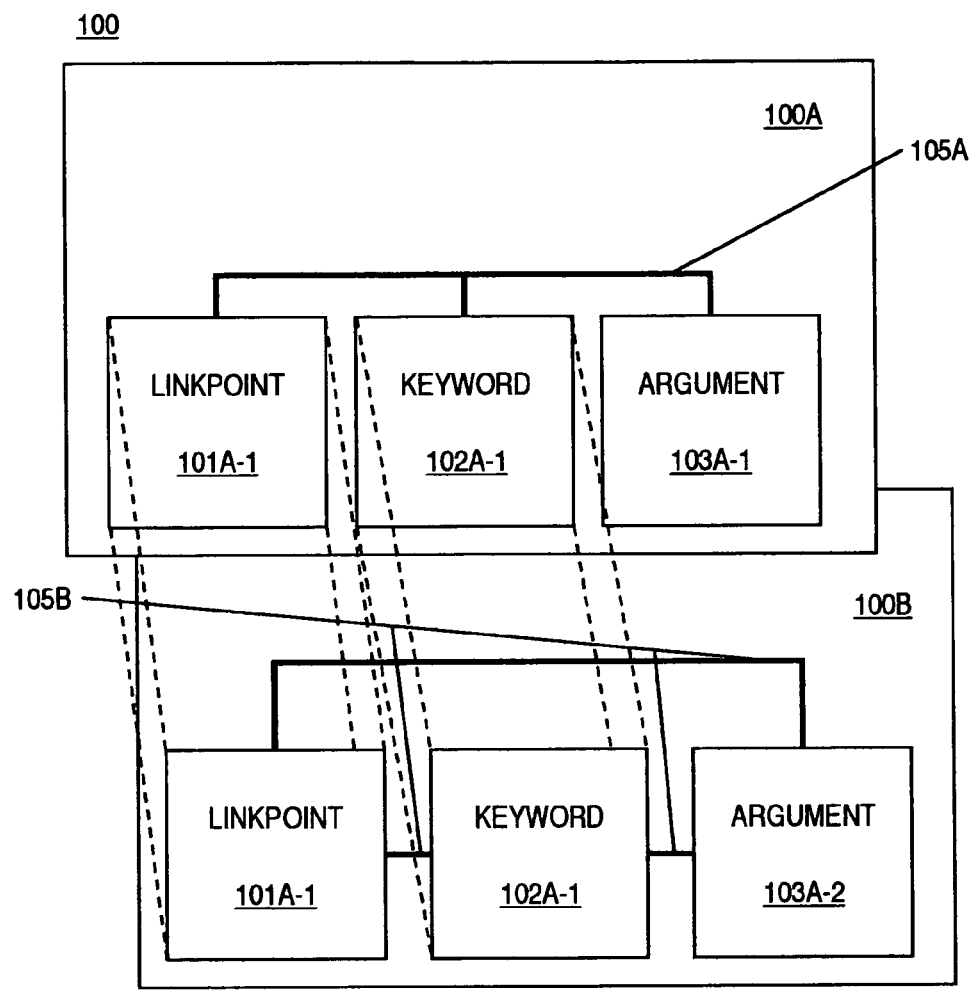
FIG. 1 is a block diagram depicting the syntactic construction of and relationship between Command Line Interface command variants, in accordance with one embodiment of the present invention.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed by computer systems. These descriptions and representations are used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "choosing," "combining," "embedding," "examining," "extracting," "formatting," "generating," "removing," "reordering," "replacing," "surrounding," or the like, refer to the action and processes of a computer system, or similar electronic computing device, that manipulates and transforms data represented as physical, e.g., electronic quantities within the communications and computer systems' registers and memories into other data similarly represented as physical quantities within the computer system memories or registers or other such information storage, transmission, or display devices.

The present invention is discussed primarily in the context of Command Line Interface of computer operating systems, wherein the operating systems and computers are engaged principally in internetworking. However, it is appreciated that the present invention is not limited to Command Line Interface, nor to IOS™ or other internetworking operating systems, nor to routers or other computers devoted to internetworking. On the contrary, the present invention may be used with other types of code, and deployed for use in other operating systems, and on computers engaged in other application, including but not limited to UNIX systems, personal computers, and a plethora of other functionalities.

Exemplary Command Structure

Exemplary Commands

With Reference to FIG. 1, the relationship 100 between, and the construction of Command Line Interface command variants 100A and 100B, in accordance with one embodiment of the present invention. The syntactic structure of a single command amenable to the operations of an embodiment of the present invention may be explained by reference to either command variant 100A or 100B; their structures are analogous, and their differences will be discussed with reference to command variants, infra. For the sake of brevity and clarity, however, the operation of a single command amenable to the operations of an embodiment of the present invention will be explained with reference only to command variant 100A, which will be referred to in the preliminary discussion as command 100A.

A command, e.g., command 100A, is a syntactic unit starting with a linkpoint, e.g., linkpoint 101A, and containing, after the linkpoint, an arbitrary number of required and optional keywords, e.g., 102A-1, and arguments, e.g., 103A-1. A linkpoint, e.g., linkpoint 101A-1, is the first keyword in a command. A keyword, e.g., keyword 102A-1, is a reserved word. An argument, e.g., argument 103A-1, is a parameter, which may be variable, and which may be numerical.

In the present embodiment, command 100A, exemplary of Command Line Interface commands, contains syntactic constructs which include, but are not limited to, linkpoint 101A-1, keyword 102A-1, and argument 103A-1. Command 100A requires documentation, in its entirety. Aspects of a command, such as usage, purpose, history, related commands, and default may be documented. Further, certain of its syntactic constructs must also be documented. Additionally, command 100A has an underlying overall syntactic structure, into which is embedded syntactic interrelationship 105A.

Syntactic interrelationship 105A forms a logical interworking within the command structure between the syntactic constructs, e.g., between linkpoint 100A-1, keyword 102A-1, and argument 103A-1, as well as any other syntactic constructs command 100A may subsume, in the present embodiment. Within any particular command, the syntactic interrelationship, e.g., command 100A syntactic interrelationship 105A, will be rigid, e.g., constant, obvious, and intentional. This, notwithstanding the fact that certain of the syntactic constructs, e.g., argument 103A-1, may be flexible.

Linkpoint 101A-1 is typical of linkpoints, which identify and describe commands. In the present embodiment, linkpoint 101A-1 identifies and describes command 100A. Linkpoint 101A-1 contains the first word, or words, of the name of command 100A. Further, linkpoint 101A-1 describes the type of command characterizing command 100A. The command identification and description Linkpoint 101A-1 provides command 100A may categorize a position for the command in a hierarchical structure of command potency. In an exemplary internetworking operating system such as IOS™, the position of command 100A in such a hierarchy, as defined by linkpoint 101A-1, may privilege the command's implementation to, for example, configuring a router. Conversely, the position of command 101A, defined by linkpoint 101A-1, may limit the command's application to, for example, routine functions (e.g., review and general housekeeping). Further, each command has a particular denoted privilege which delineates the level of work that the command can perform. For example, in IOS™, commands of privilege 'root' may be able to modify system tables, while those of privilege 'user' are generally only able to modify user data.

Keyword 102A-1 typifies reserved words, which have special meanings ordinarily applied in control statements and similar contexts, and restricted in use to in certain, predefined circumstances. Keyword 102A-1 defines the province of command 100A, and correspondingly gives the command its functionality. Keyword 102A-1 is constant and unchangeable in the context of using the command, or in generation of command file documentation, in the present embodiment; e.g., no user or documentation editing of the keyword may occur. Keyword 102A-1 requires documentation generation. Keywords, e.g., keyword 102A-1 may be of an optional, required, or combination optional character. For keywords, what must be documented is the keyword description. No name documentation is required for keywords because a keyword may only have one name. Keywords have no default values.

In the present embodiment, argument 103A-1, also requiring documentation, may be an independent variable used with keyword 102A-1 to facilitate specific operations, specified by command 100A, as a whole. The value of argument 103A-1 may be variable, and may be specified by a user. The value of argument 103A-1 may be numerical.

Each argument, e.g., argument 103A-1, has a defined type, such as numeric, range of numeric, string, etc. For example, argument 103A-1 may be defined as type 'numeric, range <1–256>'. A user must specify a number from 1 to 256 for that argument.

Argument 103A-1 requires documentation for at least two of three aspects, with the third aspect an optional one.

The first argument 103A-1 aspect which must be documented is its name. The name of argument 103A-1 is what the argument is called in the syntax of command 100A.

The second argument 103A-1 aspect requiring documentation is the description. The description of argument 103A-1 announces what the argument is used for.

A third, and optional aspect of argument 103A-1 is the default. A default identifies what the argument's value is, in the absence of specification of another value by a user. Not all arguments have default values. If an argument has a default value, it will be documented.

Arguments, e.g., argument 103A-1 may be of an optional, required, or combination optional character.

Command variants may exist which underscore the need to document them independently of the initial command. A command variant, e.g., command variant 100B, is another command starting with the same words as the first command, e.g., 100A; e.g., the linkpoints of the variants are identical. In the particular CLI of the present embodiment, each command file defines a command and may further define several variants.

In the present embodiment, command 100B is a variant of command 100A. Command variants 100A and 100B share a relationship 100 as follows. Variant 100B has much the same syntactic structure as variant 100A. Variant 100B contains syntactic constructs which include, but are not limited to, linkpoint 101A-1, keyword 102A-1, and argument 103A-2. Linkpoint 101A-1 and keyword 102A-1 are identical in command variant 100B to the linkpoint 101A-1 and keyword 102A-1 in command variant 100A. Command variants, e.g., 100A and 100B share identical linkpoints and may share some or all keywords.

Argument 103A-2 may be identical in its entirety to the corresponding syntactic construct 103A-1 in command variant 100A. However, arguments in individual command variants may differ. For example, argument 103A-2 in command variant 100B may differ from argument 103A-1 in command variant 100A.

Command variant 100B also requires documentation, in its entirety, as do certain of its individual syntactic constructs. Aspects of each variant, such as usage, purpose, history, related commands, and default may also be documented. Additionally, command variant 100B has an underlying overall syntactic structure, into which is embedded syntactic interrelationship 105B.

Syntactic interrelationship 105B forms a logical interworking within the command structure between the syntactic constructs, e.g., between linkpoint 101A-1, keyword 102A-1, and argument 103A-2, as well as any other syntactic constructs command variant 100B may subsume, in the present embodiment. Within any particular command, the syntactic interrelationship, e.g., syntactic interrelationship 105B for command variant 100B, will be rigid, e.g., constant, obvious, and intentional, and reflects the command's syntax. This, despite the fact that certain of the syntactic constructs, e.g., argument 103A-2, may be flexible, with a user-defined value, in accordance with the argument's type.

As FIG. 1 depicts, syntactic interrelationship 105B is different in some certain discernible aspects from syntactic interrelationship 105A in command variant 100A. Thus, the underlying overall syntactic structures embedding syntactic interrelationships differ between variants, e.g., each command variant has its own, unique command syntax, requiring documentation. For example, in the present embodiment, the underlying overall syntactic structures of 100A and 100B, embedding syntactic interrelationships 105A and 105B, respectively, differ. This marks a syntactic demarcation from command 100A, which marks 100B as a variant of command 100A, notwithstanding that much of its syntactic structure, e.g., corresponding keywords 102A-1 and linkpoints 101A-1 are identical, and corresponding arguments 103A-1 and 103A-2, may or may not be identical. Command variants, e.g., 100A and 100B share the first few syntactic structures, e.g., linkpoints and keywords, and may or may not share arguments; yet both continue with new, different, and distinct syntax.

Exemplary Command Files and Documentation Content Files

In the documentation required for all commands, e.g., command variants 100A and 100B, keywords, arguments, and the overall command must be documented. In the present embodiment, documentation content may be provided by the command's syntax and mode, 'help' fields on the command, and separate documentation content files.

Figure 2:
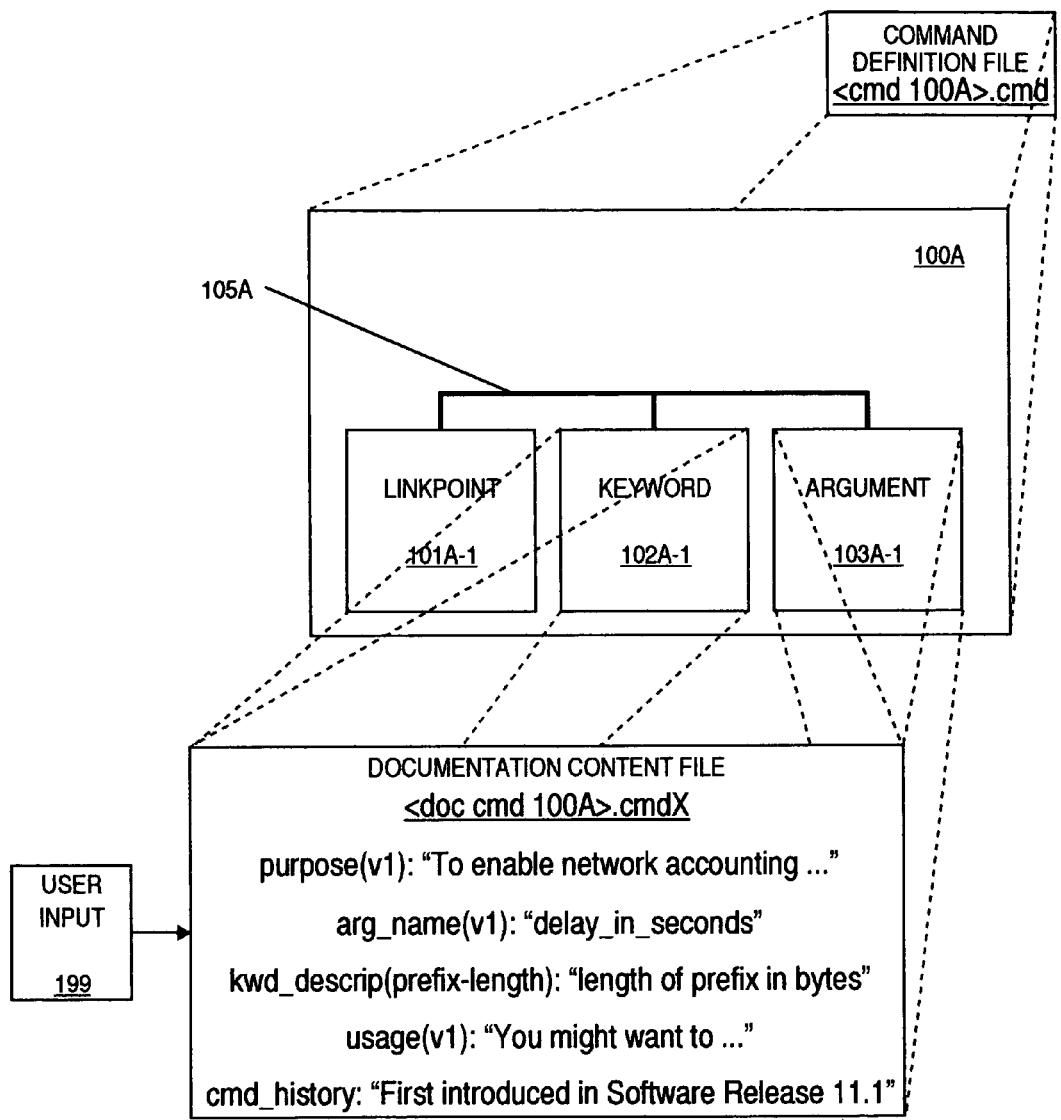
FIG. 2 is a block diagram depicting the syntactic structure of a set of Command Line Interface command variants and their documentation content, in relation to respective command specification and document content files, in accordance with one embodiment of the present invention.

With reference to FIG. 2, the syntax of a command, e.g., command 100A, is defined in the present embodiment in command definition file (cmd file) <cmd_100A>.cmd, within Command Line Interface or analogous operant code. A command definition file, in the present embodiment, may be designated <cmd_name>.cmd. Command definition file <cmd_100A>.cmd contains a syntax specification, by which the syntax of command 100A is delineated.

As depicted in FIG. 2, command definition file <cmd_100A>.cmd reflects its respective command 100A syntactically with perfect correspondence. The syntax within command definition file <cmd_100A>.cmd itself has constructs for defining all of the syntactic constructs, e.g., linkpoints, keywords, and arguments, of its corresponding command, 100A. In addition, in the present embodiment, information in the command definition file <cmd_100A>.cmd defines argument types and ranges, and the characteristics of keywords and arguments, e.g., optional, required, and combination optional. The contents of command definition file <cmd_100A>.cmd are a programming product; they are not amenable to any user input.

In the present embodiment, the command definition file <cmd_100A>.cmd may have an associated, corresponding documentation content file, e.g., <cmd_100A>.cmdX. Documentation content file <cmd_100A>.cmdX contains documentation content for the corresponding command definition file, e.g., <cmd_100A>.cmd. A documentation content file, in the present embodiment, may be designated <cmd_name>.cmdX.

In the present embodiment, a documentation content file, e.g., <cmd_100A>.cmdX, provides documentation content for the various syntactic structures of the command, e.g., keywords and arguments, for the command, itself, and for contents of the command definition file. Documentation content file <cmd_100A>.cmdX is responsive to an input 199 from operating system engineers/technical writers. In the present embodiment, annotations, changes, and documentation content may be added to the documentation content files. Advantageously, this enhances the usefulness of this embodiment and further, promotes localization of this embodiment to languages other than English, because documentation content is in a separate file.

In the present embodiment, documentation content (doc-content) file <cmd_100A>.cmdX provides documentation content for command 100A. Doc-content file <cmd_100A>.cmdX provides documentation for argument 103A-1, keyword 102A-1, and for the overall command 100A. As command file syntax defines and describes the syntax of the Command Line Interface commands, in the present embodiment, the documentation within doc-content file <cmd_100A>.cmdX may specify documentation for keywords, arguments, and the entire command.

In the present embodiment, doc-content file <cmd_100A>.cmdX specifies documentation content for argument 103A-1. The documentation provided includes the argument name, the argument description, and the argument default.

The name is what argument 103A-1 is called in the syntax of command 100A. The description is a statement relating to what the argument is used for. The default states a value for the argument, in the absence of specification of another value by a user.

Doc-content file <cmd_100A>.cmdX specifies documentation content for keyword 102A-1. Specifically, in the present embodiment, doc-content file <cmd_100A>.cmdX specifies the description of the keyword 102A-1.

For the overall command 100A, doc-content file <cmd_100A>.cmdX provides documentation of the command usage, purpose, history, related commands, and examples. In the present embodiment, this documentation may be described as follows.

"Usage" may provides documentation of command usage scenarios and interactions with other commands.

"Purpose" may document definition and description of the operation performed by a command, specifying both configuration and execution.

"History" may provide documentation of the software release in which the command originated.

"Related commands" may document reference to other commands performing functions in a related, or similar area.

Figure 10:
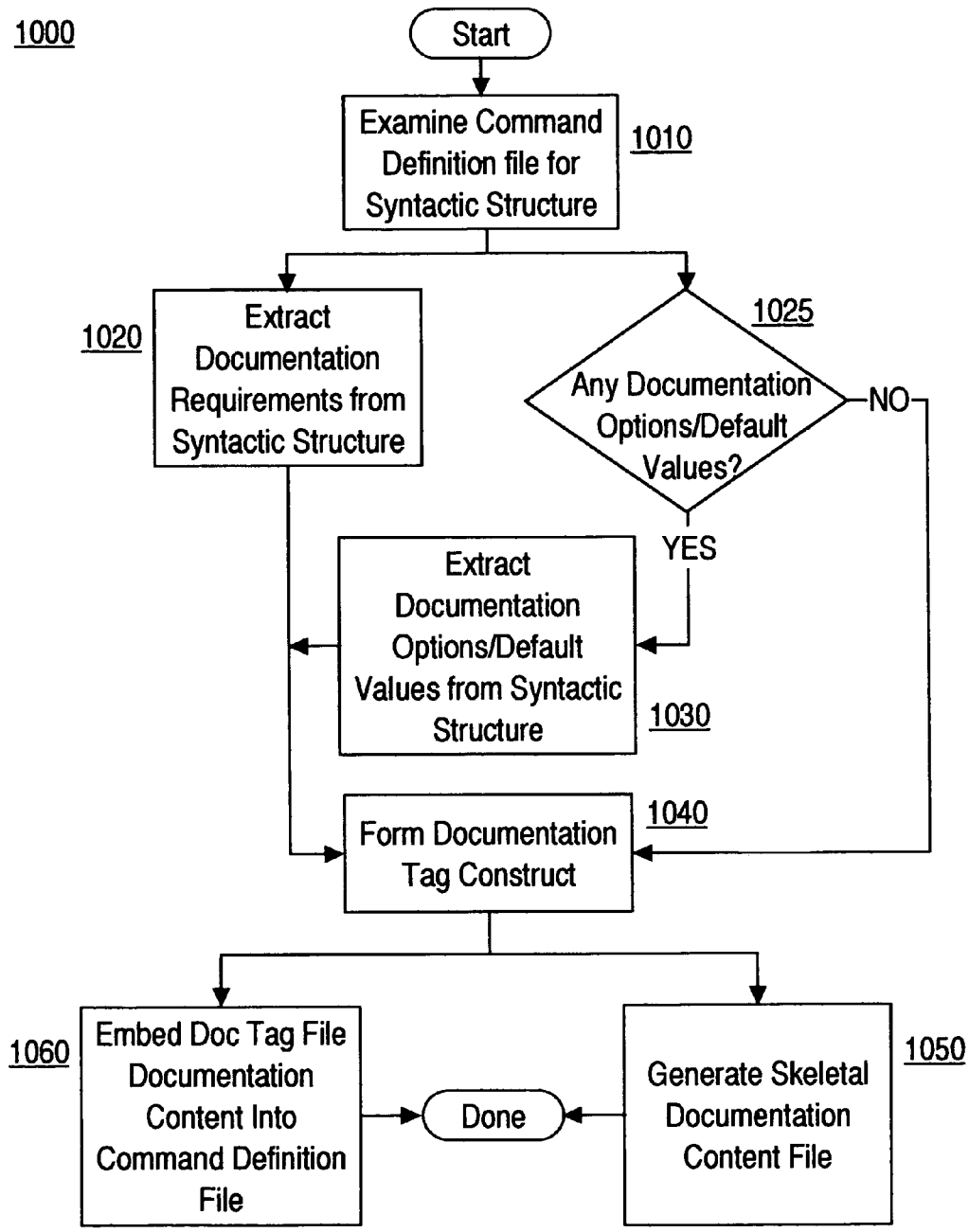
FIG. 10 is a flowchart of the steps in a process for generating command definition files with embedded documentation tags and skeletal documentation content files, in accordance with one embodiment of the present invention.

"Example" may document a sample usage of command syntax and a sample response of the computer under operational control, e.g., a router (e.g., computer system 1100, FIG. 10).

The description of this documentation, as depicted in FIG. 2, may be summarized in exemplary descriptive headings by reference to Table 1, below.

TABLE 1

EXEMPLARY DOCUMENTATION CONTENT FILE
<cmd_100A>.cmdX

| Descriptive Heading | Exemplary Documentation Content |
|---|---|
| purpose(v1): | "To enable network accounting . . . " |
| arg_name(v1): | "delay_in_seconds" |
| kwd_descrip(prefix length): | "length of prefix in bytes" |
| usage(v1): | "You might want to . . . " |
| cmd_history: | "First introduced in Software Release 11.1" |

With reference to Table 1, above, note that "v" refers to a variant number, "kwd_descrip" represents the keyword description, and "cmd_history" denotes the command history. Advantageously, the present embodiment is accessible to an input from operating system engineers/technical writers, who may input any documentation within the doc-content fields which may be of particular usefulness to them. The doc-content may be in English, or in any other language. This expediency of the present embodiment promotes localization to languages other than English.

Collectively, this documentation forms a corpus of documentation content, e.g., a documentation content file (e.g., <cmd_100A>.cmdX). Documentation content files, may, in accordance with one embodiment of the present invention, be worked, with the command definition file, e.g., <cmd_100A>.cmd, by a documentation tool to generate useful documentation.

Documentation information is packaged within command definition files and command documentation content files in a format characterized by documentation tags. In one embodiment of the present invention, documentation tags are embedded within command definition files. In one embodiment of the present invention, models of command documentation content files may be generated in the form of templates, e.g., skeleton documentation tag files.

Exemplary Documentation Tags

Exemplary Documentation Tags

Figure 3A:
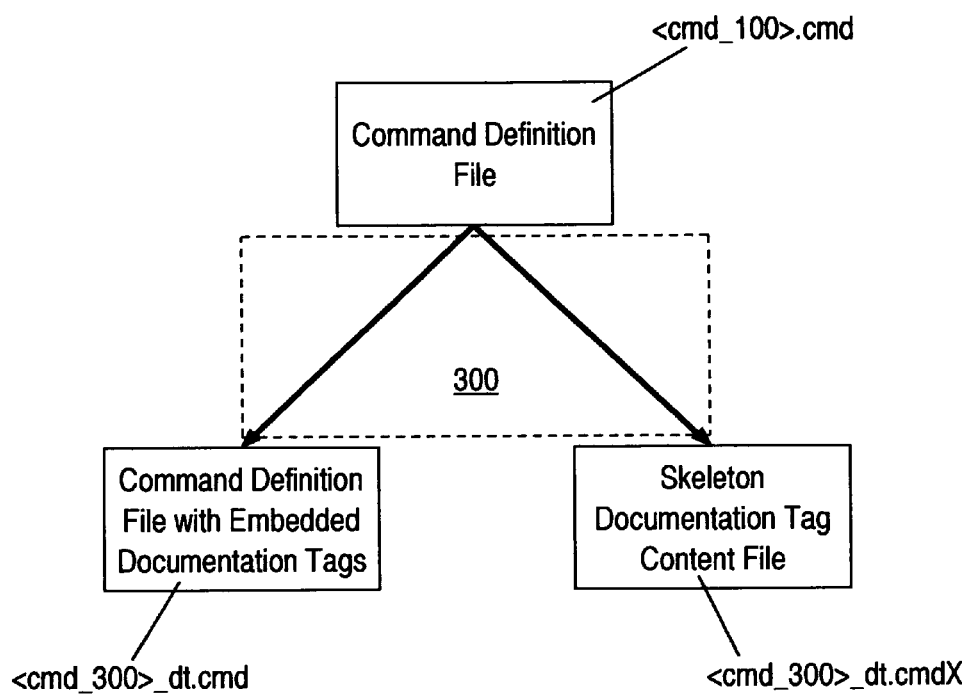
FIG. 3A is a block diagram depicting the relationship between a command definition file and a command definition file with embedded documentation tags, and template command documentation content file formed in accordance with one embodiment of the present invention.

With reference to FIG. 3A, command definition files, e.g., <cmd_100A>.cmd is augmented by the addition of documentation information from documentation tags to form a command definition file with embedded documentation tags, <cmd_300>_dt.cmd. It is appreciated that other formats may be used to delineate documentation tags; the present invention is not limited by the exemplary format used to illustrate the present embodiment.

Further depicted in FIG. 3A, command definition files, e.g., <cmd_300A>.cmd, are utilized to automatically generate template documentation tags, e.g., <cmd_300>_dt.cmdX.

Both command definition file with embedded documentation tag <cmd_300>_dt.cmd and template documentation tag <cmd_300>_dt.cmdX are formed by a process 300.

Exemplary Documentation Tag Formation

Figure 3B:
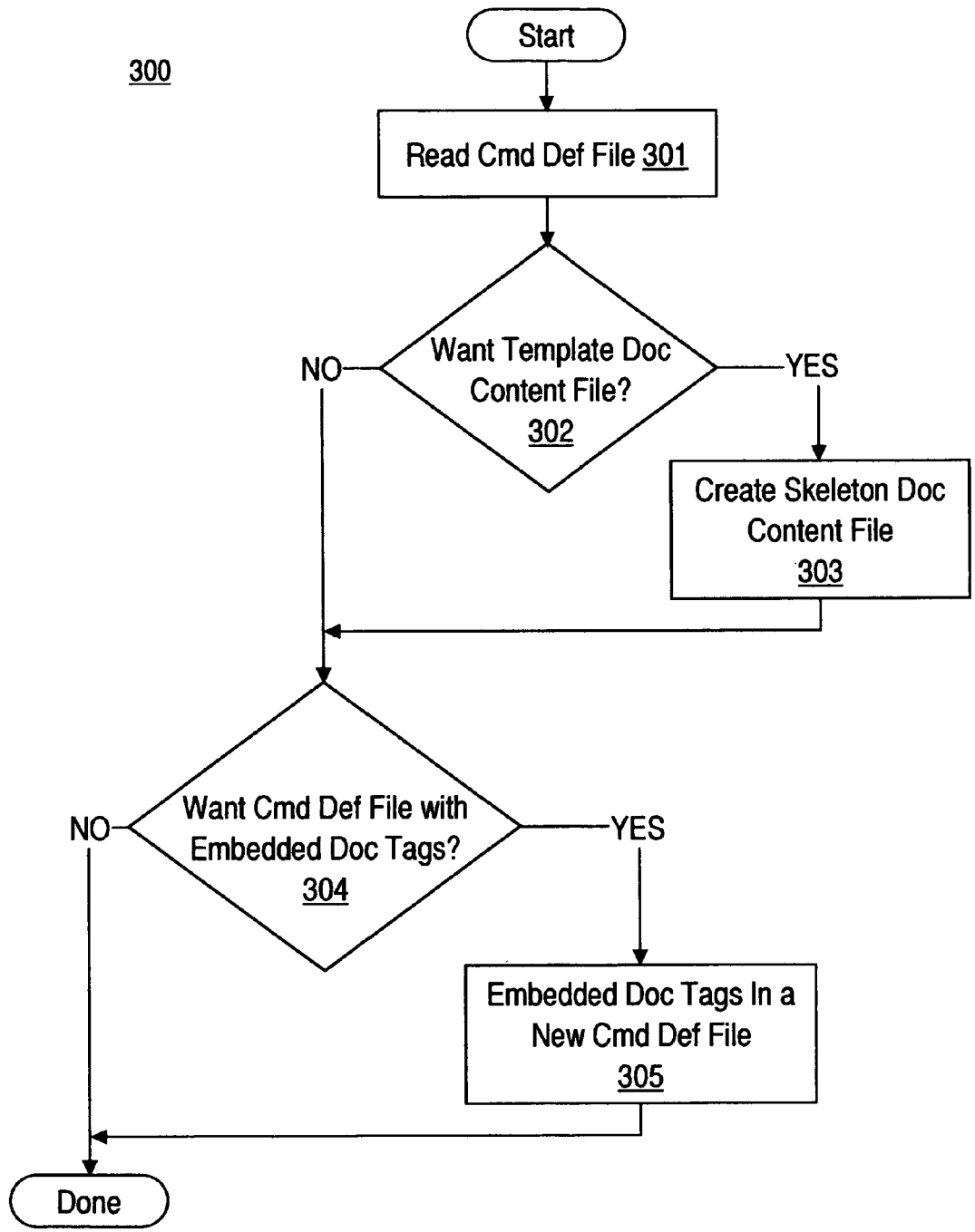
FIG. 3B is a flow chart of the steps in a process for embedding documentation tags in a command definition file and creating a skeleton documentation tag file, in accordance with one embodiment of the present invention.

Process 300, with reference to FIG. 3B, begins by reading command definition file <cmd_300A>.cmd, step 301.

In step 302, a decision is made whether a template documentation content file is desired.

If so, a skeletal documentation tag file, e.g., <cmd_300>_dt.cmd, is created, step 303.

Upon creation of the template file in step 303, or if no template is desired in step 302, another decision is made whether a command definition file with embedded documentation tags is desired, step 304.

If so, a command definition file with embedded documentation tags, e.g., <cmd_300>_dt.cmd, is created, step 305.

Upon creation of the command definition file with embedded documentation tags, or if no such file is desired, e.g., in step 304, process 300 is complete.

Figure 4:
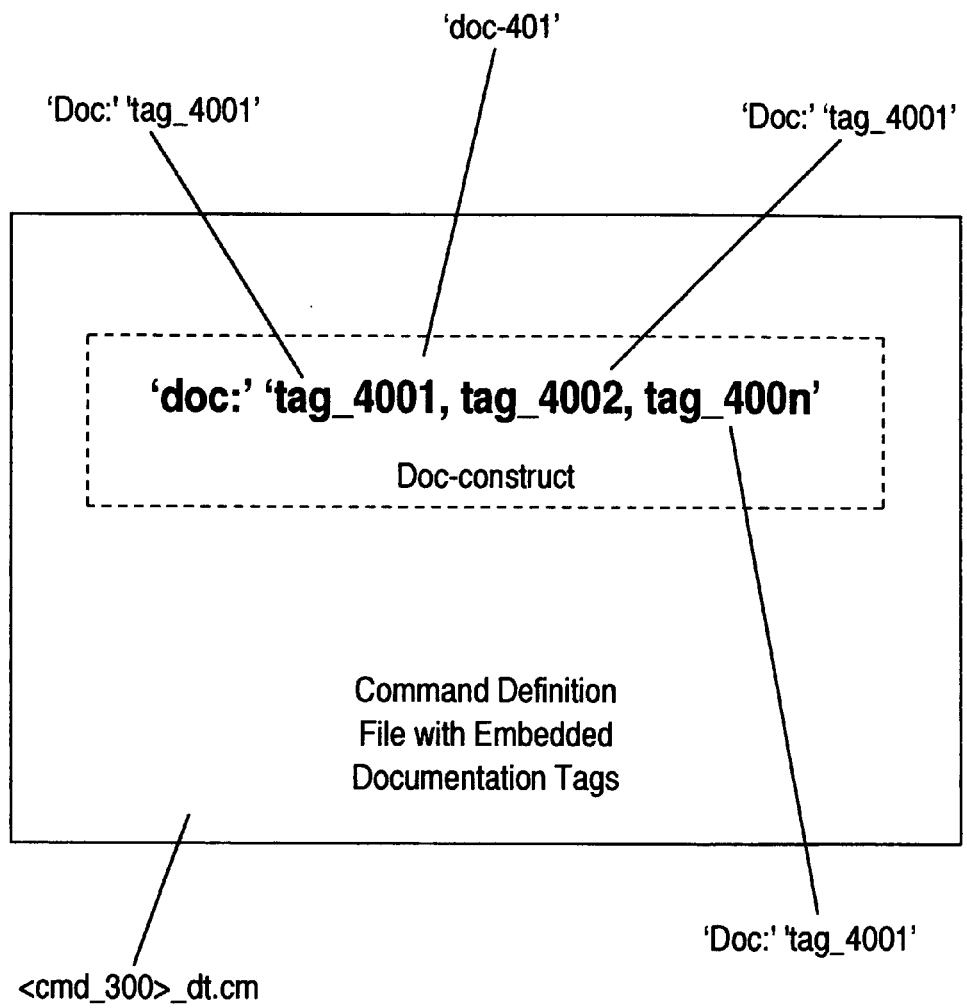
FIG. 4 is a block diagram depicting the internal syntactic structure of a command definition file with an embedded documentation construct of several documentation content tags, in accordance with one embodiment of the present invention.

With reference to FIG. 4, the structure of a command definition file with embedded documentation tags <cmd_300>_dt.cmd is depicted, in accordance with one embodiment of the present invention. The File <cmd_300>_dt.cmd embeds documentation construct doc-401 containing n individual documentation tags, e.g., 'doc tags' 4001, 4002, 400n.

In one embodiment of the present invention, a documentation construct, e.g., doc-401, may contain required and optional documentation, formatted as documentation tags. An exemplary documentation structure is depicted in FIG. 5.

Figure 5:
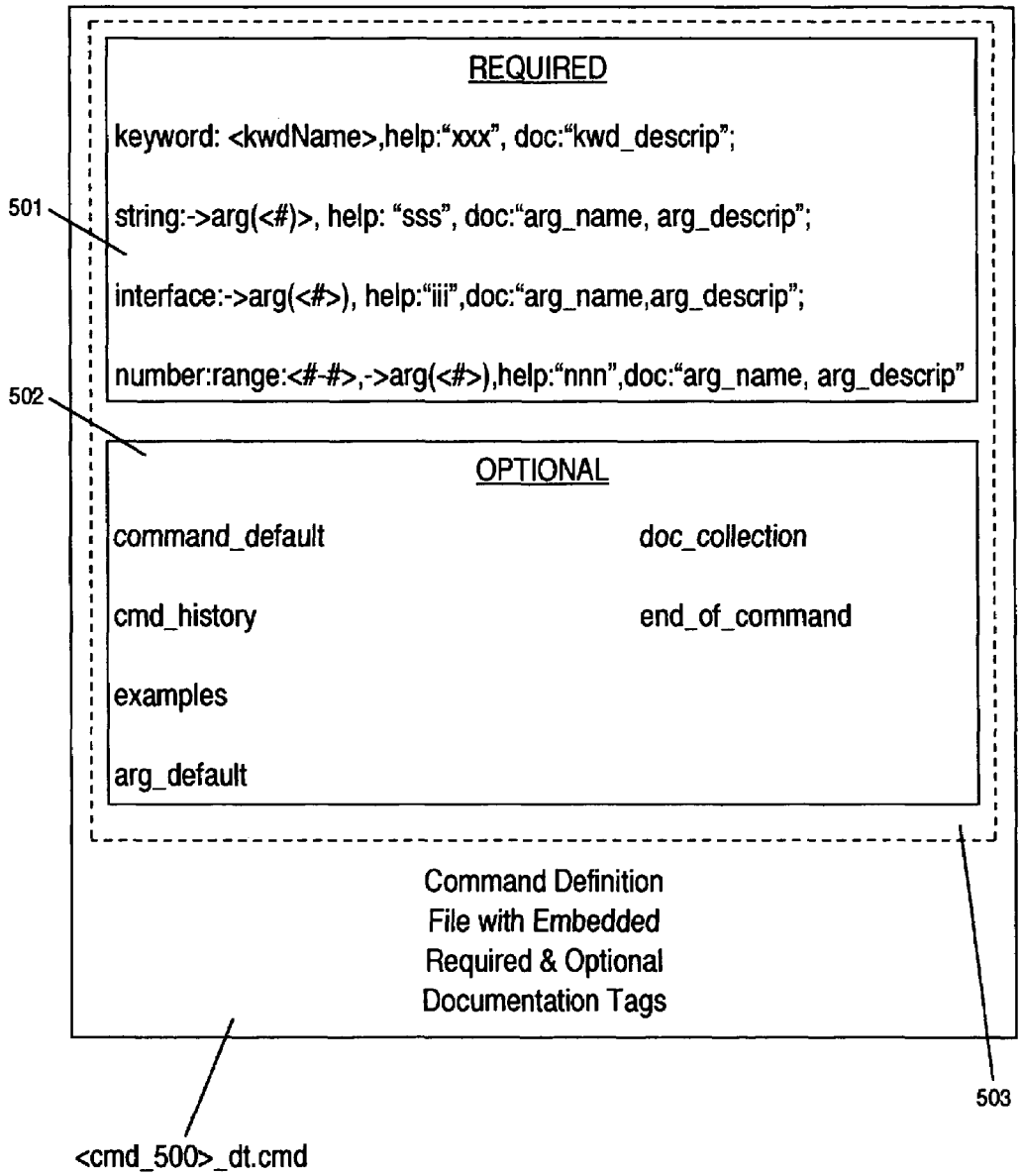
FIG. 5 is a block diagram depicting the internal syntactic structure of a command definition file with an embedded documentation construct of several required and several optional documentation content tags, in accordance with one embodiment of the present invention.

In FIG. 5, a command definition file with embedded documentation tags <cmd_500>_dt.cmd of one embodiment embeds synthetic doc-construct doc-501, inside of which individual documentation tags are arranged in two fields 501 and 502. Field 501 is an arrangement of three (3) required documentation tags. Field 502 is an arrangement of six (6) optional documentation tags. Examples of required, optional, and combination required documentation tags are tabulated in FIG. 6.

Exemplary Formatting

Exemplary Format

With reference to FIG. 6, table 601 presents the format of the three (3) required documentation tags of the embodiment of field 501 (FIG. 5). It is appreciated that other formats may be used; the present invention is not limited to the exemplary format used to illustrate the following embodiments.

Documentation tags are required for keywords and arguments in command definition files (e.g., <cmd_100A>.cmd; FIG. 2), as well as for the entire command. The required documentation tag for a 'keyword' is 'kwd_descrip' and is formatted as follows:

Keyword<kwdName>,help:"xxx", doc:"kwd_descrip";

for example:

Keyword:format,help:"format a device", doc:"kwd_descrip".

Arguments may be of type string arguments, interface arguments, or numerical arguments, among other types. Thus, required documentation tag values for arguments may be tailored for any of these argument types. An exemplary declaration for a string argument, with its required documentation tags is formatted as follows:

->arg(<#>), help: "sss", doc:"arg_name, arg_descrip";

An exemplary declaration for a interface argument, with its required documentation tags is formatted as follows:

interface:->arg(<#>), help:"iii",doc:"arg_name,arg_descrip";.

An exemplary declaration for a numerical argument, with its required documentation tag is formatted as follows:

number:range:<#-#>,->arg(<#>),help:"nnn",doc:"arg_name,arg_descrip";.

In one embodiment, command level documentation (e.g., in addition to keyword/argument level) is also formally formatted. At the command level, required tags are 'purpose' and 'usage'. Table 602 lists a collection of required and optional command level doc-tags, e.g., a 'doc-collection.' In the present embodiment, doc-collections may be anywhere in the command's syntax definition. A doc-collection may be formatted as follows:

doc_collection:"purpose,cmd_default,cmd_history,usage, example, related_cmds";

Alternatively, command level doc-tags may be defined by placing them on the end of command declaration (e.g., 'endofcmd'). For example, in the alternative embodiment:

. . . ;endofcmd,doc:"purpose, usage"

Documentation formatted as doc-tags also reside in documentation content files (e.g., <doc_cmd_100A>.cmdX; FIG. 2). Advantageously, documentation content is kept separate, in the present embodiment, from command definition syntax. For example, in one embodiment, the doc-tag name 'value' resides therein. Table 603 lists three exemplary optional documentation tags, 'command default,' 'command history,' and 'example'. It is appreciated that other optional documentation tags may document other optional command documentation content.

In the format of the present embodiment, the tags are first denominated, ending in a colon. After the colon, a field delineated by quotation marks manifests the information documented. Optional documentation tags may have arrangements similar to the following exemplary formats.

command_default: "the default behavior is to turn logging off"

cmd_history(v1):"First introduced in release 11.1"

examples(v1): "Following is sample usage of and output from the 'show disk space' command:>show disc space <filesystem1>Filesystemtotal-memory used unused
<filesystem1> 300M 50M 250M".

In the second and third of the foregoing examples, the parenthetic 'v' refers to the designation of a variant. In the present example, 'cmd_history' and 'examples' are identified by 'v1' as first variants.

In one embodiment of the present invention, automatically generated doc-tags are formatted within a generated doc-tag doc-content file. The format applied to the generation of documentation tag templates, e.g., skeletal doc-tags names, and values, in one embodiment, is tabulated in FIG. 7. First, the tag name is denominated. Then, any variant number is given, preceded by the letter 'v', all in parentheses.

For a Keyword doc-tag, following the variant number and separated from it by a comma, the keyword name is given, also delineated by parentheses, and followed by a colon. After the colon, the value of the documentation tag is delineated by quotation marks. It is appreciated that variant are optional content. They may be utilized advantageously to disambiguate to which variant number the doc tag belongs.

For an argument doc-tag, following the variant number and separated from it by a comma, the argument number (arg number) is given, also delineated by parentheses, and followed by a colon. After the colon, the value of the documentation tag is delineated by quotation marks. It is appreciated that variant numbers and arg numbers are optional content. They may be utilized advantageously to disambiguate to which arg number and variant number the doc tag belongs. This optional context information is not needed when there is only one keyword or argument in a particular variant, or only one variant in a particular command definition file.

Exemplary Related File Set

Referring now to FIGS. 8A through 8C, an exemplary set of command files, related in accordance with one embodiment of the present invention is profiled. In FIG. 8A, the base command definition file flash_fsck.cmd is delineated. Its syntactic structures are formatted as described in FIG. 7. They include the keywords 'fsck' and 'nocrc', and a single string argument. It is appreciated that the 'help' fields provide natural language explanations of the keywords and argument, in the present embodiment.

FIG. 8B delineates the related command definition file flash_fsck.dt_cmd, automatically generated with embedded documentation tags, in accordance with one embodiment of the present invention. Note that much of the syntactic structure is identical with the base command definition file flash_fsck.cmd, in particular, the keywords 'fsck' and 'nocrc', and the single string argument. It is appreciated that the documentation tags for the keyword description, "kwd_descrip", and for the argument name, description, and default value, "arg_name,arg_descrip,arg_default", are provided without value herein. Advantageously, this prevents cluttering the command definition file with documentation content and corruption of end-user data. Further, the documentation collection is listed.

Figure 11:
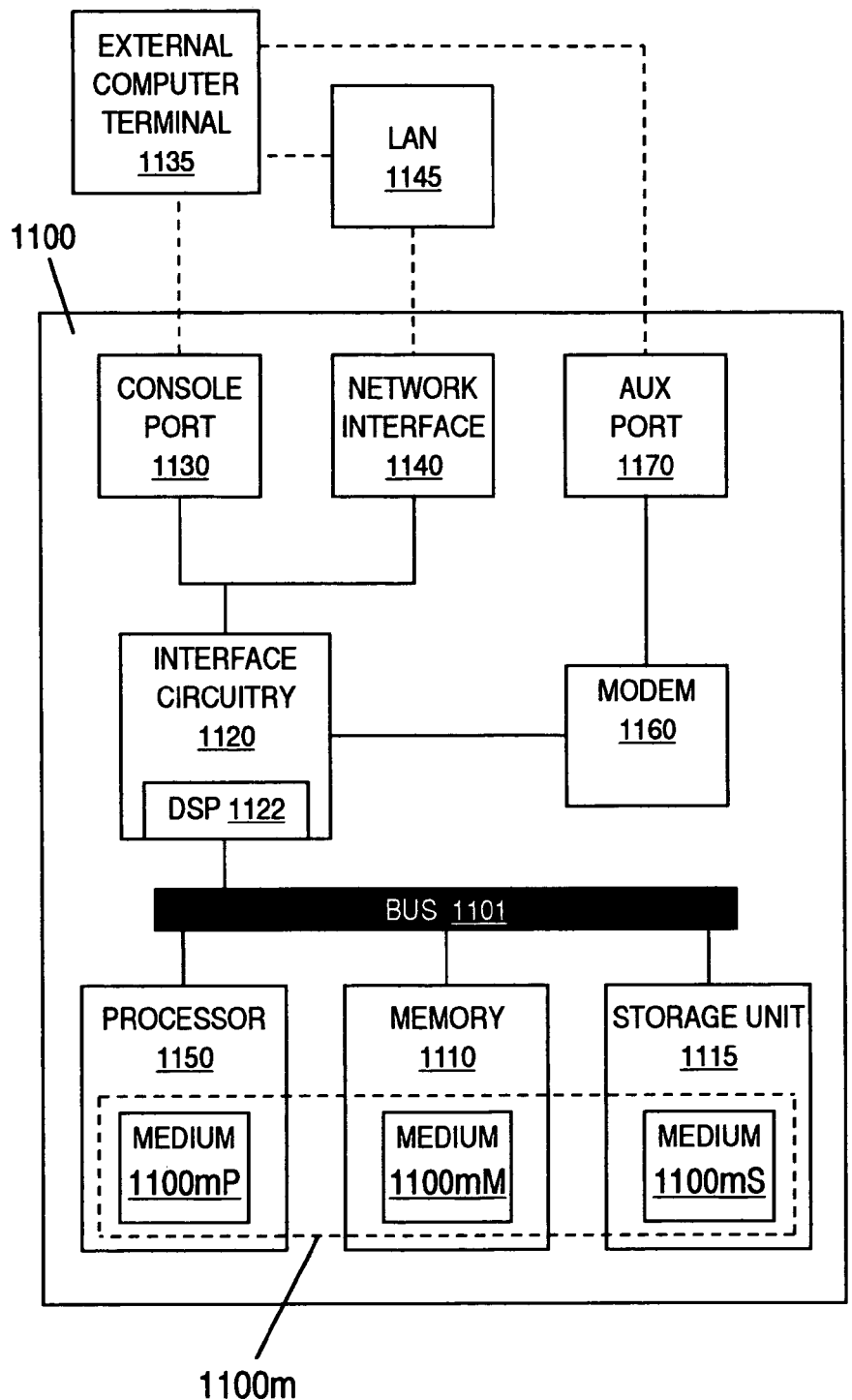
FIG. 11 is a block diagram depicting a computer system for reading computer readable code, including code defining operating system CLI commands and novel heuristics, and for implementing a process of generating documentation tags, in accordance with one embodiment of the present invention.

Referring to FIG. 8C, the related command documentation content file, flash_fsck.dt_cmdX, automatically generated with documentation content value, in accordance with one embodiment of the present invention, is depicted. The documentation content values listed, in the present embodiment, are automatically generated by processes (e.g., processes 900A–900E; FIGS. 9A–9E, respectively) executed by processors and electrical components under the control of computer readable and computer executable instructions, residing, for example, in data storage features such as computer usable memory 1110 and/or computer usable storage unit (e.g., memory 1110 and storage unit 1115; FIG. 11), or in any type of computer readable medium.

Documentation content is expressed in the present documentation content file. It is appreciated that the documentation content provide natural language explanation of the keywords and arguments, in the present embodiment. The documentation tags also provide natural language explanation of the command's purpose, and history. The command's default value, usage, and related commands may also be explained in natural language, by documentation tag values in the present embodiment. Although the present example declines to do so (e.g., the present exemplary command has no specified default value, usage, or related commands), dedicated fields are available for these specified documentary applications. Further, the present embodiment provides a natural language example of the command's operational application. Advantageously, the present embodiment's use of natural language in documentation tags promotes linguistic (e.g., natural language) localization.

Exemplary Processes

Exemplary Documentation Processes

Figure 9A:
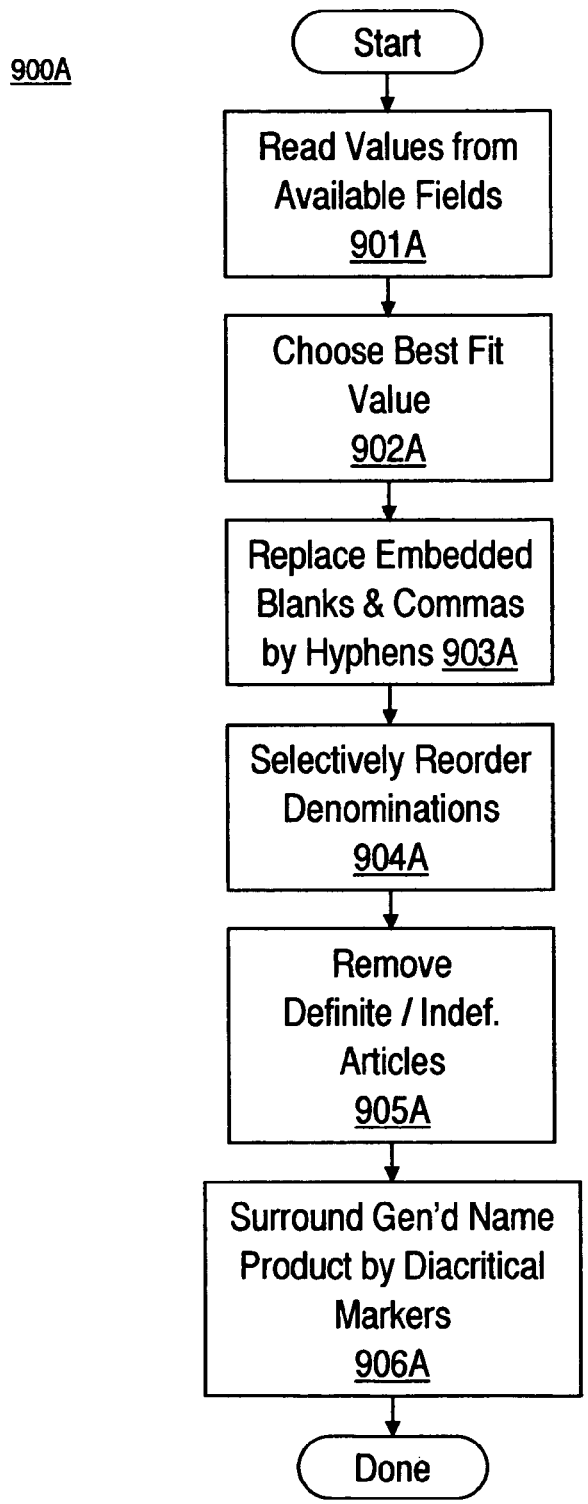
FIG. 9A is a flow chart of the steps in a process for generating a general skeleton or template documentation tag, in accordance with one embodiment of the present invention.

With reference to FIG. 9A, the steps in a general process 900A automatically generate a new command definition file with embedded documentation tags (e.g., <cmd_300>_dt.cmd; FIG. 4) and skeletal documentation with initial tag values in a skeleton (e.g. template) documentation content file (e.g., FIG. 4B). Such a skeletal documentation content file may provide a template for engineers/technical writers involved in command documentation with initial values which may be augmented or overwritten, and/or other useful functions. These templates provide a formatted platform which function to inspire authoring of documentation values which, while more correct, more complete, and more accurately and precisely applicable than the templates, share the basic skeletal structure, format, and grammar.

Process 900A, in one embodiment, is carried out by processors and electrical components under the control of computer readable and computer executable instructions. The computer readable and computer executable instructions reside, for example, in data storage features such as computer usable memory 1110 and/or computer usable storage unit 1115 of FIG. 11. However, the computer readable and computer executable instructions may reside in any type of computer readable medium. Although specific steps are disclosed in flowchart 900A, such steps are exemplary. That is, the present invention is well suited to performing various other steps or variations of the steps recited in FIG. 9A. Within the present embodiment, it should be appreciated that the steps of flowchart 900A may be performed by software or hardware or any combination of software and hardware, and may be performed in other sequences than the sequence shown.

Process 900A begins with step 901A, wherein initial documentation content values are read from available fields. One such field is the 'help' field. Another is the command syntax, including nouns and verbs, extant within command definition files.

After reading all values in the available fields, a best fit value is chosen, step 902A, and that best fit value's grammar appropriated.

In one embodiment, the actions of generating documentation in the form of documentation tag values (step 902A) are functions of a custom artificial intelligence engine, running on a computer processor (e.g., processor 1150, FIG. 11). In one embodiment, the artificial intelligence engine executes an artificial intelligence program embodied in a computer readable medium (e.g., 1100*m*, FIG. 11). In one embodiment, the computer readable medium (1100*m*, FIG. 11) is deployed in varying aspects between the processor (1150, FIG. 11), a memory (e.g., 1110, FIG. 11) and a storage unit (e.g., 1115, FIG. 11), respectively (e.g., media 1100 mP, 1100 mM, and 1100 mS, FIG. 11).

For generation of argument names, upon appropriating the grammar of the best fit value, blanks and commas embedded in argument name values are replaced by separator characters, step 903A.

Argument names appropriated from the best fit value are selectively reordered, step 904A.

In step 905A, documentation content appropriated from the 'help' fields is further adjusted by removal of definite and indefinite articles.

Upon subsequent surrounding of the resultant generated argument name by diacritical markers, step 906A, process 900A is complete.

Figure 9B:
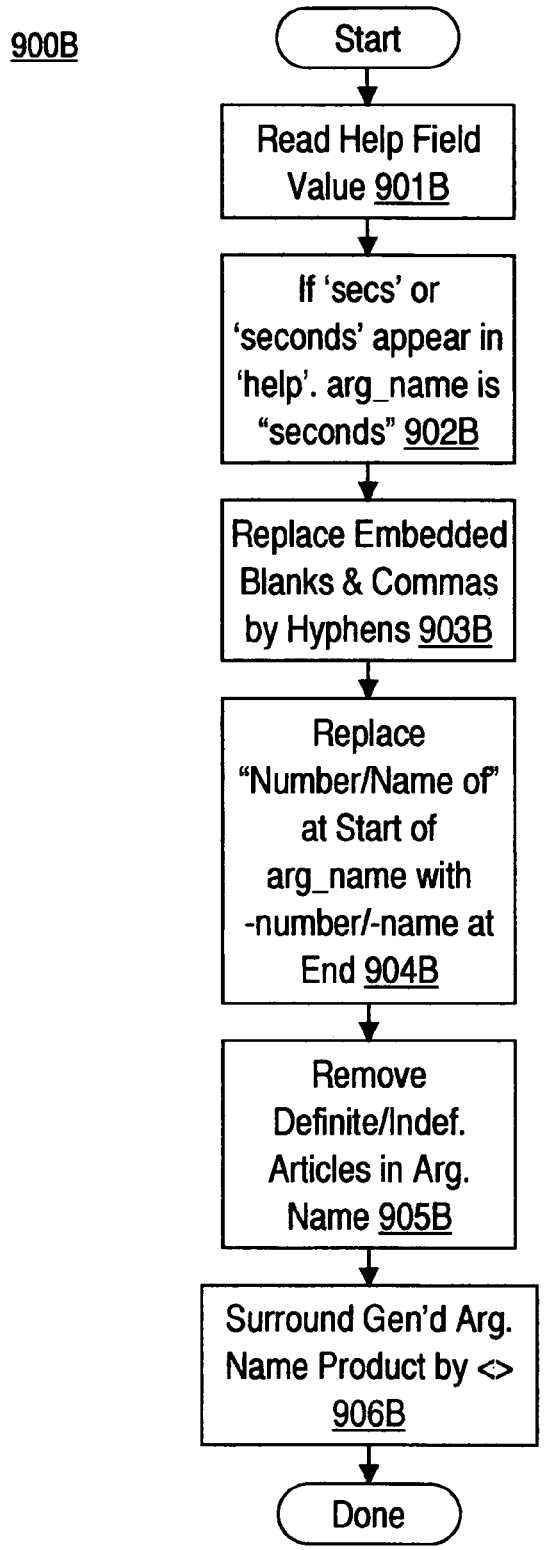
FIG. 9B is a flow chart of the steps in a process for generating an exemplary skeleton or template documentation tag, in accordance with one embodiment of the present invention.

Referring now to FIG. 9B, an exemplary application of the general process is made to generate a specific template argument name (arg_name) in a process 900B.

Process 900B, in one embodiment, is carried out by processors and electrical components under the control of computer readable and computer executable instructions. The computer readable and computer executable instructions reside, for example, in data storage features such as computer usable memory 1110 and/or computer usable storage unit 1115 of FIG. 11. However, the computer readable and computer executable instructions may reside in any type of computer readable medium. Although specific steps are disclosed in flowchart 900A, such steps are exemplary. That is, the present invention is well suited to performing various other steps or variations of the steps recited in FIG. 9B. Within the present embodiment, it should be appreciated that the steps of flowchart 900B may be performed by software or hardware or any combination of software and hardware, and may be performed in other sequences than the sequence shown.

Beginning at step 901B, possibly applicable documentation values in the 'help' field are read.

The values gleaned from the 'help' field enable generation of an argument name. In one embodiment, generating this argument name is an artificial intelligence (AI) function. In one embodiment, this AI function runs on a custom AI engine, running on a computer processor (e.g., processor 1150, FIG. 11). In one embodiment, the AI engine executes an AI program embodied in a computer readable medium (e.g., 1100*m*, FIG. 11). In one embodiment, the computer readable medium (1100*m*, FIG. 11) is deployed in varying aspects between the processor (1150, FIG. 11), a memory (e.g., 1110, FIG. 11) and a storage unit (e.g., 1115, FIG. 11), respectively (e.g., media 1100 mP, 1100 mM, and 1100 mS, FIG. 11).

In the present embodiment, for example, if a time value, such as 'secs' or 'seconds' appear within the 'help' field, the AI function decides that the argument name to be generated is "seconds," step 902B. Appropriate English (or other natural language) grammatical constructs, e.g., nouns and/or verbs, are extracted with the value from the 'help' field. In the present example, a noun, "seconds," is extracted from the 'help' field.

It is appreciated that only arguments of type 'string' use the 'help' field to generate argument names. Other argument types have analogous generation constructs. For a first example, range arguments (e.g., arguments of the form '<##>', wherein the first number '#' delineates the low end of the range, and the second number '#' delineates the high end of the range), names are generated as '<low-high>'. For a second example, interface type arguments have their names generated as '<interface>'.

Embedded blanks and commas are replaced by separator characters for generating argument names, step 903B.

Then, "Number/Name of" at the start of the arg_name is replaced with "-Number/-Name" at the end, selectively reordering the arg_name denomination, step 904B. Advantageously, this promotes brevity and consistency across different command files.

In step 905B, definite and indefinite articles are removed from the arg_name.

The argument name product is surrounded by < > to form the skeleton '<seconds>,' step 906B, completing process 900B.

Figure 9C:
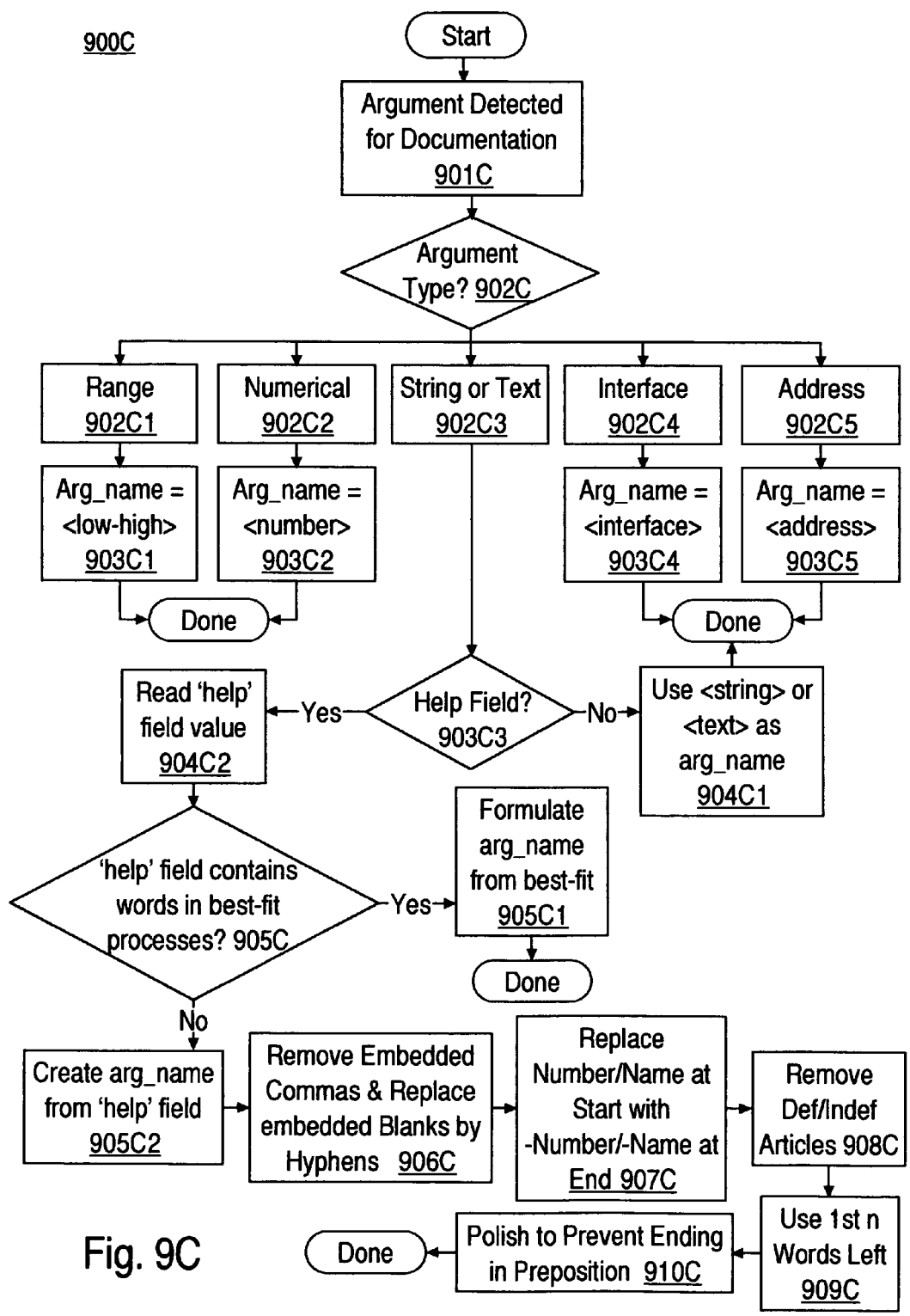
FIG. 9C is a flow chart of the steps in a process for generating an exemplary argument name, in accordance with one embodiment of the present invention.

With reference to FIG. 9C, the steps in a process 900C detail the automatic generation of argument name documentation tags, in accordance with one embodiment of the present invention. In one embodiment, Process 900C, is carried out by processors and electrical components under the control of computer readable and computer executable instructions. The computer readable and computer executable instructions reside, for example, in data storage features (e.g., computer usable memory 1110 and/or computer usable storage unit 1115; FIG. 11), but may reside in any type of computer readable medium. In one embodiment, certain steps of process 900C (e.g., steps 905C, 905C1, and/or 905C2) are executed by an AI engine operating through the computer readable medium. Although specific steps are disclosed in flowchart 900C, such steps are exemplary. That is, the present invention is well suited to performing various other steps or variations of the steps recited in FIG. 9C. Within the present embodiment, it is appreciated that the steps of flowchart 900C may be performed by software or hardware or any combination of software and hardware, and may be performed in other sequences than the sequence shown.

Beginning at step 901C, an argument to be documented is detected. In step 902C, the argument type is determined. If the argument type is a range, numerical, interface, or address, the argument is given a corresponding name, steps 902C1, 902C2, 902C4, and 902C5, respectively. The names corresponding to these various argument types are delineated in Table 2, below.

TABLE 2

| Argument Type | Corresponding Argument Name |
|---|---|
| Range | <low–high> |
| Numerical | <number> |
| Interface | <interface> |
| Address | <address> (e.g., specific) |

Upon naming the appropriate arguments according to Table 2, process 900C is complete. However, if the argument type is string or text, process 900C continues; step 902C3.

In step 903C3, a 'help' field is sought. If no 'help' field is found, the argument name is taken directly from the identity of the string or text, respectively; step 904C1. At this point, process 900C may be complete. However, if a 'help' field is found in step 903C3, the 'help' field value is read; step 904C2.

It is determined in step 905C whether the 'help' field contains words in best-fit processes. If so, the argument name is formulated from the best-fit value in step 905C1, and process 900C may be complete.

However, if no best-fit words are found in the 'help' field in step 905C, the argument name (arg-name) is created from the 'help' field, in its entirety; step 905C2.

Embedded commas are then removed and embedded blanks are replaced by separator characters; step 906C.

"Number/Name of" at the start of the arg_name is replaced with "-Number/-Name" at the end, selectively reordering the arg_name denomination, step 907C.

In step 908C, definite and indefinite articles are removed from the arg_name.

Some number n of first words (e.g., the first five words) left after deleting the articles (step 908C) are used to form a name; step 909C.

The name formed (step 909C) is then polished, such as to prevent ending the argument name in a preposition; step 910C. At this point, process 900C is complete.

Figure 9D:
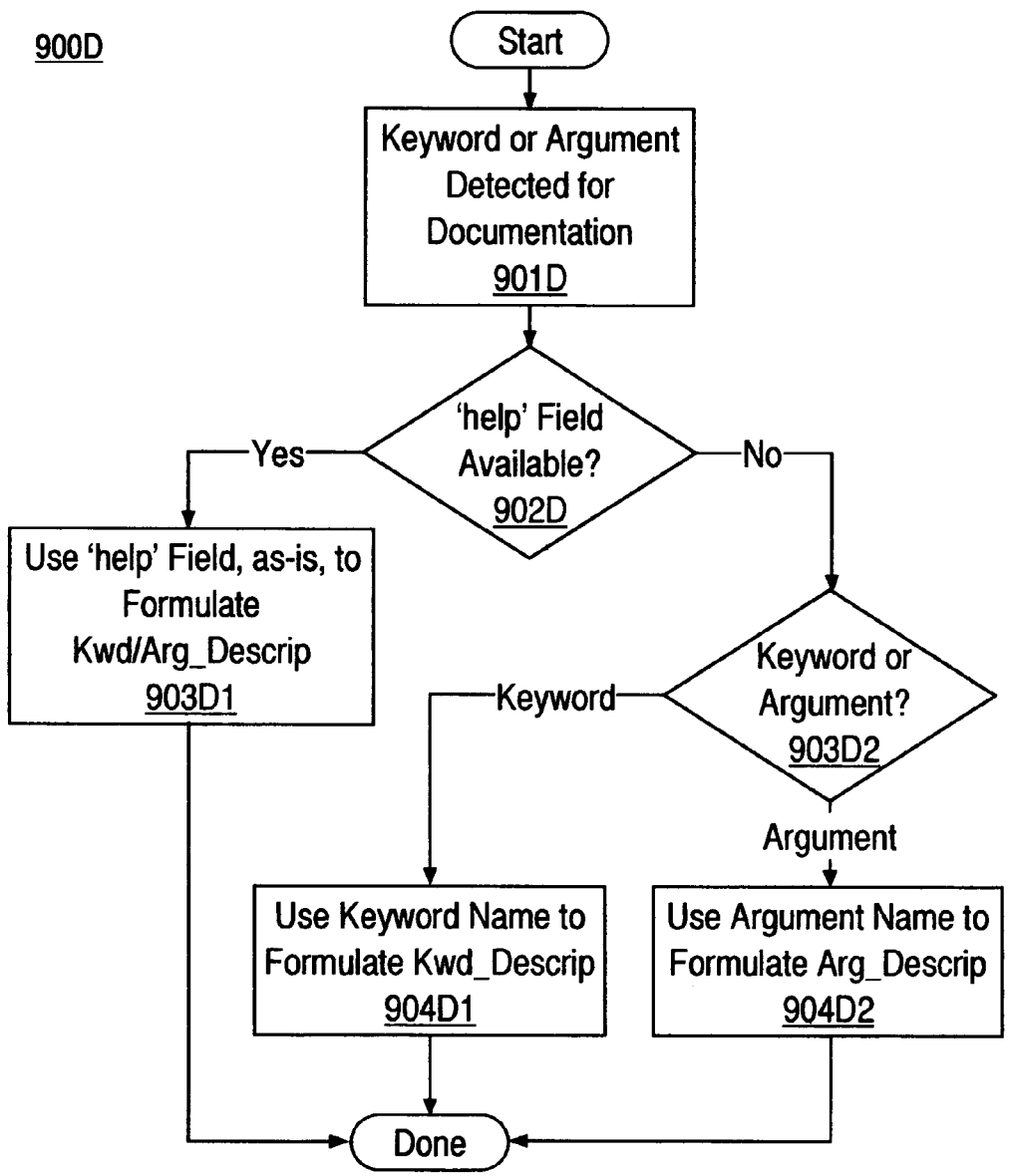
FIG. 9D is a flow chart of the steps in a process for generating an exemplary keyword and/or argument description, in accordance with one embodiment of the present invention.

With reference to FIG. 9D, the steps in a process 900D detail the automatic generation of argument description documentation tags, in accordance with one embodiment of the present invention. In one embodiment, Process 900D, is carried out by processors and electrical components under the control of computer readable and computer executable instructions. The computer readable and computer executable instructions reside, for example, in data storage features (e.g., computer usable memory 1110 and/or computer usable storage unit 1115; FIG. 11), but may reside in any type of computer readable medium. In one embodiment, certain steps of process 900D (e.g., step 903D1) are executed by an AI engine operating through the computer readable medium. Although specific steps are disclosed in flowchart 900D, such steps are exemplary; the present invention is well suited to performing various other steps or variations of the steps recited in FIG. 9D. Within the present embodiment, it is appreciated that the steps of flowchart 900D may be performed by software or hardware or any combination of software and hardware, and may be performed in other sequences than the sequence shown.

Beginning at step 901D, a syntactic construct, either a keyword or an argument is detected for documentation.

At step 902D, the availability of a 'help' field for that syntactic construct is ascertained.

If a 'help' field is available, the help field is used as-is, to formulate a description for its syntactic construct; step 903D1. Process 900D may be complete at this point.

However, if no 'help' field is available (e.g., in step 902D), it is decided in step 903D2 whether the syntactic construct detected may be identified as either a keyword or as an argument.

Depending on the outcome of the decision in step 903D2, the name of the syntactic construct is used accordingly. If the syntactic construct is a keyword, the keyword name is used to formulate the description; step 904D1. If the syntactic construct detected is an argument, the argument number is used correspondingly; step 904D2. At this point, process 9D is complete.

Figure 9E:
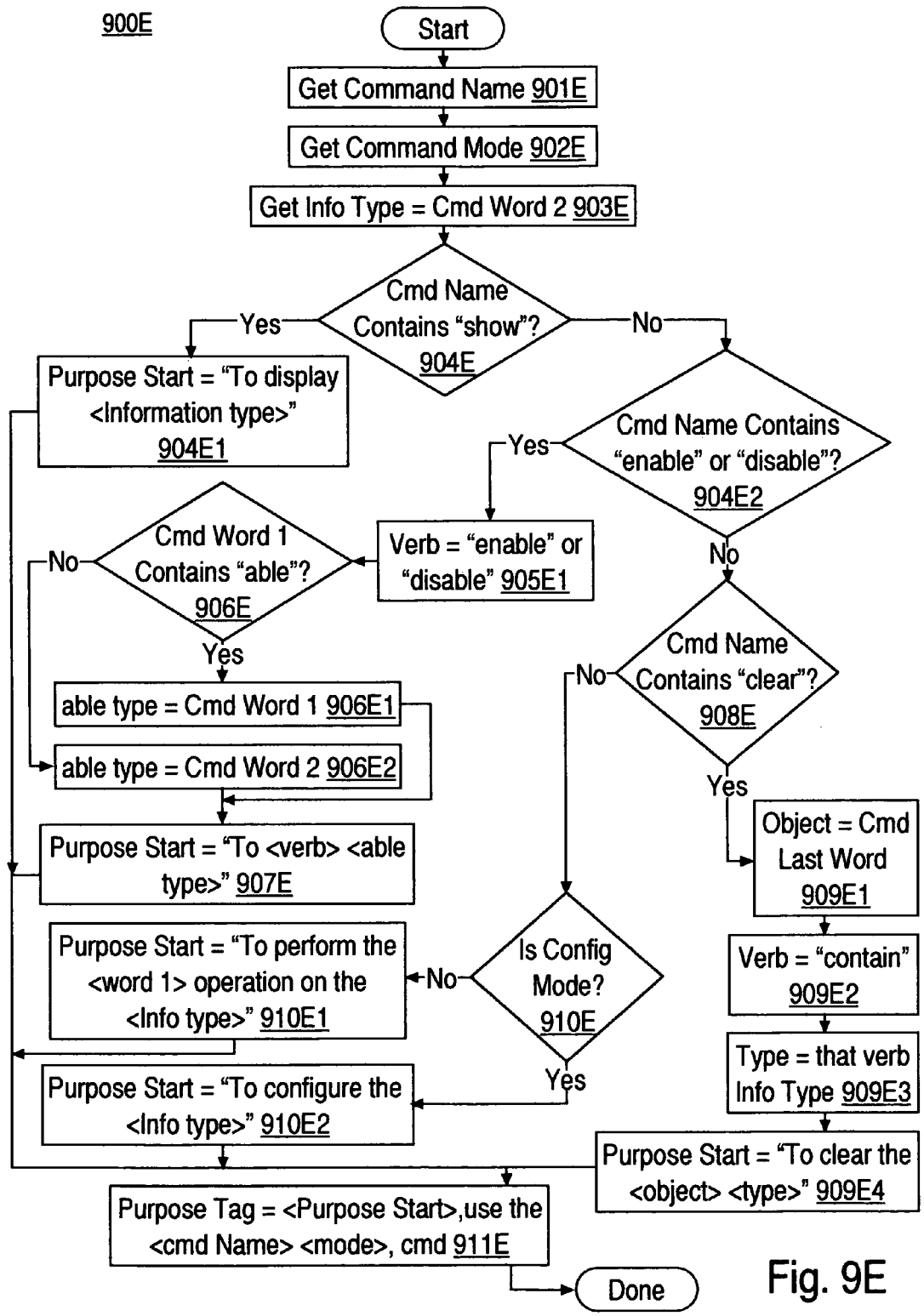
FIG. 9E is a flow chart of the steps in a process for generating an exemplary command purpose documentation tag, in accordance with one embodiment of the present invention.

Referring now to FIG. 9E, the steps in a process 900E are described, wherein a command purpose documentation tag is generated automatically, in accordance with one embodiment of the present invention. In one embodiment, Process 900E, is carried out by processors and electrical components under the control of computer readable and computer executable instructions. These computer readable and computer executable instructions reside, for example, in data storage features (e.g., computer usable memory 1110 and/or computer usable storage unit 1115; FIG. 11), but may reside in any type of computer readable medium. In one embodiment, certain process 900E steps (e.g., steps 903E, 904E, 904E2, 906E, 908E, etc.) are executed by an AI engine operating using the computer readable medium. Although specific steps are disclosed in flowchart 900E, such steps are exemplary; the present invention is well suited to performing various other steps or variations of the steps recited in FIG. 9E. Within the present embodiment, it is appreciated that the steps of flowchart 900E may be performed by software or hardware or any combination of software and hardware, and may be performed in other sequences than the sequence shown.

Beginning at step 901E, a command's name is determined.

Next, the command's mode is also determined; step 902E. Command mode is defined in the command definition file (e.g., flash_fsck.cmd; FIG. 8A). For example, the mode of the exemplary 'flash_fsk.cmd' command of FIG. 8A is 'exec' ("execute"). Other command modes may include, for example, 'config' ("configure") and 'global_config' ("global configure"), among others.

In the present embodiment, an information type is retrieved in step 903E, determining the second word in the command syntax, if there is more than one word, or the single word of a one-word command.

In step 904E, it is decided if the command name contains the word "show". If it does, the 'purpose start' generated in step 904E1 is "To display <information type>".

If the command name does not contain the word "show" (step 904E), it is then decided in step 904E2 if the command name contains either of the words "enable" or "disable."

If either of these words is found present (step 904E2), the verb for the command purpose tag is correspondingly chosen in step 905E1 to be either "enable" or "disable."

Next, in step 906E, it is decided whether the command's first word contains the root word of the foregoing words, "able." An 'able' type is generated accordingly. If so, the 'able' type is decided to be 'cmd word 2'; step 906E1. Conversely, if "able" is not in the command's first word, the 'able' type is decided to be 'cmd word 1'; step 906E2. The corresponding 'purpose start' generated in step 907E is "To <enable/disable><able type>".

If the command name contains neither "enable" nor "disable," (step 902E2), it is decided in step 908E whether the command name contains the word "clear." If so, in step 909E1, the purpose documentation tag's object is specified to be the command's last word.

In step 909E2, the purpose documentation tag's verb is specified according to whether its object is singular or plural. If the object is singular, the verb will be "contains" and if plural, "contain." In step 909E2, the verb becomes contain(s). The type becomes that verb info type; step 909E3. A corresponding purpose start is generated; step 909E4:

"To clear the <object><type>".

If the command name does not contain the word "clear" (step 908E), it is decided in step 910E whether the command mode contains "config" (e.g., 'config' or 'global config'). If not, the corresponding 'purpose start' generated in step 910E1 is "To perform the <word 1> operation on the <info type>".

If "config" is in the command mode, the corresponding 'purpose start' generated in step 910E2 is "To configure the <info type>".

After generating any purpose start (e.g., following completion of any of steps 904E1, 909E4, 910E1, or 910E2), a purpose documentation tag is generated accordingly; step 911E. In the present embodiment, the purpose documentation tag has a format such as <Purpose Start>,use the <cmd Name><mode>cmd.

Upon generating the purpose documentation tag in step 911E, process 900E is complete.

With reference to FIG. 10, a process 1000 produces both documentation templates and command definition files with embedded documentation tags.

Process 1000, in one embodiment, is carried out by processors and electrical components under the control of computer readable and computer executable instructions. The computer readable and computer executable instructions reside, for example, in data storage features such as computer usable memory 1110 and/or computer usable storage unit 1115 of FIG. 11. However, the computer readable and computer executable instructions may reside in any type of computer readable medium. Although specific steps are disclosed in flowchart 1000, such steps are exemplary. That is, the present invention is well suited to performing various other steps or variations of the steps recited in FIG. 10. Within the present embodiment, it should be appreciated that the steps of flowchart 1000 may be performed by software or hardware or any combination of software and hardware, and may be performed in other sequences than the sequence shown.

Beginning with step 1010, a command definition file (e.g., 100A, FIG. 1) is examined to ascertain a syntactic structure of its commands.

In step 1020, documentation requirements are extracted from the syntactic structure. For example, if a keyword (e.g., 102A-1; FIG. 2) is detected in the syntactic structure, documentation requirements include a keyword description. For another example, if an argument (e.g., 103A1, FIG. 1) is detected in the syntactic structure in step 1010, documentation requirements dictate an argument name and an argument description. In one embodiment, an argument name is generated; its value is based on the 'help' field and the argument's type (e.g., string, number, range, interface, etc.).

In step 1025, it is determined whether there is any optional documentation extant. For example, an argument (e.g., 103A1, FIG. 1) may have an argument default value. An argument value may be detected in one of two places. First, it may be detected within a command definition file (e.g., .cmd files such as <cmd_100A>.cmd and exemplary flash_fsck.cmd; FIGS. 2 and 8A, respectively), in a specific syntactic construct specifying a default. Second, it may be found in an existing doc-tag value file (e.g., a .cmdX file such as <doc_cmd_100A>.cmdX; FIG. 2).

Upon detecting the presence of an argument (e.g., arguments 103A1 and ->arg (1); FIGS. 2 and 8A, respectively) within a command definition file (e.g., <cmd_100A>.cmd and exemplary flash_fsck.cmd; FIGS. 2 and 8A, respectively), wherein the argument has a default value specified in the argument's optional syntax, e.g., its default value, is extracted, step 1030.

If no documentation options were detected in step 1025, or upon extraction of documentation options in step 1030, a documentation tag (doc-tag) construct (doc-tag; e.g., 'doc-tag 4001–400n; FIG. 4) is formed, step 1040. Doc-tags are generated for each aspect of documentation, optional, if present, and required (e.g., argument name, argument description, keyword description, usage, purpose, etc.).

In step 1050, a template, e.g., skeletal documentation content file (e.g., flash_fsck_dt.cmd; FIG. 8C) is formed, step 1060. Further, the doc-tag is embedded into the command definition file, forming a command definition file with embedded doc-tags (e.g., flash_fsck_dt.cmd) step 1060. In one embodiment, steps 1050 and 1060 may be performed in any order. In one embodiment, steps 1050 and 1060 are performed substantially simultaneously. Upon execution of steps 1050 and 1060, process 1000 is complete.

In one embodiment, examination of the command definition file (step 1010) and detection and extraction of documentation requirements (step 1020), and options (step 1030) well as certain aspects of subsequent steps, are artificial intelligence functions.

Exemplary Computer System

In accordance with one embodiment of the present invention, a computer system 1100 and computer usable medium 1100m enables the generation of documentation content from operating system command specifications. With reference to FIG. 7, computer system 1100 includes a bus 1101 for communicating information, a central processor 1050 coupled with the bus 1101 for processing information and instructions, and a memory unit 1110 (e.g., random access memory and/or read only memory) and a data storage system 1115 coupled with the bus 1101 for storing information and instructions. Data storage system 1115 may be any magnetic and/or optical disc and drive/reader, or any other data storage device.

In one embodiment of the present invention, the processes described, including but not limited to generation of command definition files with embedded documentation tags and documentation templates (e.g., Processes 300, 800, 900A, 900B, and 1000, FIGS. 3A and 3B; 8, 9A, 9B and 10, respectively) may be executed by processor 1150, which may be an application specific integrated circuit (ASIC). Alternatively, these methods may be implemented by processor 1150 executing a program stored in memory 1110 and/or data storage system 1115. It is appreciated that computer system 1100 may implement the invention by combinations of these schemes, or by alternatives other than those pictured. It is appreciated that computer system 1100 can include other elements not shown. It is further appreciated that computer system 1100 may be constituted by any functional equivalent, or by any viable alternative architecture.

In the present embodiment, computer system 1100 may also optionally include host interface circuitry 1120 coupled to bus 1101. Host interface circuitry 1120 includes an optional digital signal processor (DSP) 1122 for processing data to be transmitted or data that are received via communications device 1160 or via console port 1130, or network interface 1140. Alternatively, processor 1150 can perform some or all of the functions performed by DSP 1122.

In the present embodiment, computer system 1100 may also optionally include a communications device 1160. Communications device 1160 may be a modulator/demodulator (MODEM). Communications device 1160 enables communication via an auxiliary port 1170.

In the present embodiment, computer system 1100 may be communicatively coupled with external computer terminal 1135, directly via console port 1130, or through network interface 1140, via external network 1145. External network 1145 may be a local area network (LAN), or any other feasible network configuration.

Computer system 1100 executes a program embodied in a computer readable medium 1100m which may be deployed as embodied to various degrees between processor 1150 (e.g., as 1100 mP), memory 1110 (e.g., as 1100 mM), and storage unit 1015 (e.g., as 1100 mS).

In summary, a method, system, and computer readable medium for documentation that promotes uniformity, minimizes error, omission, and documentary data destruction, and is not tedious is described. The present invention provides a method and system of documentation that systematically supports both localization to languages other than English and higher level documentation. The present invention also provides a method and system of documentation wherein documentation syntax optimally represents actual documentation contents, and documentation produced conforms adequately with structural standards.

In one embodiment, a process is executed wherein a command definition file is examined for syntactic structure. Documentation requirements and options are extracted to form a command definition file with embedded documentation tags and a template documentation content file are formed. In one embodiment, a documentation template is formed by reading documentation content values from available fields and choosing a best fit value, removing commas and replacing embedded blanks by separator characters, selectively reordering syntactic structure names, removing definite and indefinite articles, and surrounding by diacritical markers. In one embodiment, the process is performed by a computer system. In one embodiment, the computer system is a router. In one embodiment, the computer system performs the process by executing a program embedded in a computer readable medium. In one embodiment, the process is performed upon the operating system of the computer system. In one embodiment, the operating system is an internetworking operating system.

The present invention provides a method and system of documentation that promotes uniformity and minimizes error, omission, and accidental documentation data destruction. In one embodiment, automated generation of documentation tags obviates the tedium of editing command definition files and adding command documentation content. One embodiment systematically supports both localization to languages other than English and generation of higher level documentation, e.g., HTML. In one embodiment, generated documentation syntax optimally represents actual documentation contents, and documentation produced conforms adequately with structural standards. In one embodiment, English-like syntax of certain generated documentation content provides a clear model of actual content. In one embodiment, automatically generated, formatted templates provide a standard framework replaceable with precise documentation content and data applicable in documentation generation. Overriding automatically generated skeletal values with desired real values is simple, and automatically generated documentation appears in the same directory in obvious places, advantageously rendering the present embodiment intuitively simple.

An embodiment of the present invention, a method, system, and computer readable medium for automatically documenting system commands and command files and generating skeletal documentation content therefrom, is thus described. While the present invention has been described in particular embodiments, it should be appreciated that the present invention should not be construed as limited by such embodiments, but rather construed according to the following claims.

What is claimed is:

1. In a computer operating system using commands with command specifications in command definition files, a method for generating command documentation content, said method comprising:
   a) examining a command definition file for a syntactic structure of a corresponding command, wherein said command definition file comprises a linkpoint, a keyword, and an argument;
   b) extracting a documentation requirement from said syntactic structure wherein said syntactic structure represents documentation content of said command definition file with natural language syntax;
   c) extracting documentation options from said syntactic structure wherein said documentation requirement and said documentation options correspond to a partial fraction of actual content of said command definition file;
   d) combining said documentation requirement and said documentation options into a documentation tag construct wherein said documentation tag construct is embeddable into said command definition file; and
   e) automatically generating a standard template for a documentation content file, wherein said document content file comprises a natural language explanation of said keyword and said argument, wherein said document content file provides a standard framework with automatically generated content and wherein said automatically generated content is end-user over-writable with at least one of documentation content and data of localized relevance to said end-user.

2. The method as recited in claim 1 wherein said command comprises a first command of a plurality of commands and wherein said document content file further comprises a natural language explanation of one or more of:
   a default value relating to said command;
   a usage relating to said command;
   a second command of said plurality of commands wherein said second command is related to said first command; and
   an example relating to said usage.

3. The method as recited in claim 2 further comprising:
   f) copying said command definition file into a second command definition file; and
   g) embedding said documentation tag construct into said second command definition file wherein said documentation tag construct comprises a plurality of documentation tags and wherein one of said documentation tags of said plurality relates to:
   said keyword;
   a string relating to said argument;
   an interface relating to said argument; and
   a number range relating to said argument.

4. The method as recited in claim 3 wherein one or more of said documentation tags of said plurality relates to:
   a documentation collection relating to said purpose;
   a default relating to said command;
   a history relating to said command; and
   an example of said usage, wherein values respectively relating to said default, said history, and said example are accessed from said documentation content file.

5. The method as recited in claim 1 wherein said e) comprises:
   examining available fields for fitable values;
   choosing a best fit value from among said fitable values;
   removing embedded commas;
   replacing embedded blanks with separator characters;
   selectively reordering names of said syntactic structure;
   removing definite and indefinite articles to form a first product; and
   surrounding said first product by diacritical markers to form a final product.

6. The method as recited in claim 1 further comprising converting said documentation content to Hyper Text Markup Language.

7. A computer system comprising:
   a bus;
   a memory coupled to said bus; and
   a processor coupled to said bus and implementing an operating system wherein said operating system uses commands with command specifications in command definition files, said processor performing a process for automatically generating command documentation content, said process comprising:
   a) examining a command definition file for a syntactic structure of a corresponding command, wherein said command definition file comprises a linkpoint, a keyword, and an argument;
   b) extracting a documentation requirement from said syntactic structure wherein said syntactic structure represents documentation content of said command definition file with natural language syntax;
   c) extracting documentation options from said syntactic structure wherein said documentation requirement and said documentation options correspond to a partial fraction of said actual content associated with said command definition file;
   d) combining said documentation requirement and said documentation options into a documentation tag construct wherein said documentation tag construct is embeddable into said command definition file; and
   e) automatically generating a standard template for a documentation content file, wherein said document content file comprises a natural language explanation of said keyword and said argument, wherein said document content file provides a standard framework with automatically generated content and wherein said automatically generated content is end-user over-writable with at least one of documentation content and data of localized relevance and to said end-user.

8. The computer system as recited in claim 7 wherein said command comprises a first command of a plurality of commands and wherein said document content file further comprises a natural language explanation of one or more of:
   a default value relating to said command;
   a usage relating to said command;
   a second command of said plurality of commands wherein said second command is related to said first command; and
   an example relating to said usage, and wherein said process further comprises:
   f) copying said command definition file into a second command definition file; and
   g) embedding said documentation tag construct into said second command definition file, wherein said documentation tag construct comprises a plurality of documentation tags and wherein one of said documentation tags of said plurality relates to:
   said keyword;
   a string relating to said argument;
   an interface relating to said argument; and
   a number range relating to said argument.

9. The computer system as recited in claim 7 wherein one or more of said documentation tags of said plurality relates to:
    a documentation collection relating to said purpose;
    a default relating to said command;
    a history relating to said command; and
    an example of said usage, wherein values respectively relating to said default, said history, and said example are accessed from said documentation content file.

10. The computer system as recited in claim 9 wherein said e) further comprises:
    examining available fields for fitable values;
    choosing a best fit value from among said fitable values;
    removing embedded commas;
    replacing embedded blanks with separator characters;
    selectively reordering denominations;
    removing definite and indefinite articles to form a first product; and
    surrounding said first product by diacritical markers to form a final product.

11. A computer usable medium having a computer readable program code embodied therein for causing a computer to perform a process for automatically generating command documentation content, said process comprising:
    a) examining a command definition file for a syntactic structure of a corresponding command, wherein said computer has an operating system using a command of a plurality of commands, said command having specifications in a command definition file and wherein, wherein said command definition file comprises a link point, a keyword, and an argument;
    b) extracting a documentation requirement from said syntactic structure wherein said syntactic structure represents documentation content of said command definition file with natural language syntax;
    c) extracting documentation options from said syntactic structure wherein said documentation requirement and said documentation options correspond to a partial fraction of said actual content associated with said command definition file;
    d) combining said documentation requirement and said documentation options into a documentation tag construct wherein said documentation tag construct is embeddable into said command definition file; and
    e) automatically generating a template for a documentation content file, wherein said document content file comprises a natural language explanation of said keyword and said argument, wherein said document content file provides a standard framework with automatically generated content and wherein said automatically generated content is end-user over-writable with at least one of documentation content and data of localized relevance to said end-user.

12. The computer usable medium as recited in claim 11 wherein said command comprises a first command of a plurality of commands and wherein said document content file further comprises a natural language explanation of one or more of:
    a default value relating to said command;
    a usage relating to said command;
    a second command of said plurality of commands wherein said second command is related to said first command; and
    an example relating to said usage, and wherein said process further comprises:
    f) copying said command definition file into a second command definition file; and
    g) embedding said documentation tag construct into said second command definition file, wherein said documentation tag construct comprises a plurality of documentation tags and wherein one of said documentation tags of said plurality relates to:
        said keyword;
        a string relating to said argument;
        an interface relating to said argument; and
        a number range relating to said argument.

13. The computer usable medium as recited in claim 11 wherein said one or more of said documentation tags of said plurality relates to:
    a documentation collection relating to said purpose;
    a default relating to said command;
    a history relating to said command; and
    an example of said usage, wherein values respectively relating to said default, said history, and said example are accessed from said documentation content file.

14. The computer usable medium as recited in claim 13 wherein said e) comprises:
    examining available fields for fitable values;
    choosing a best fit value from among said fitable values;
    removing embedded commas;
    replacing embedded blanks with separator characters;
    selectively reordering denominations;
    removing definite and indefinite articles to form a first product; and
    surrounding said first product by diacritical markers to form a final product.

15. A system for automatically generating command documentation content for commands of a computer operating system, said system comprising:
    a) means for examining a command definition file for a syntactic structure of a corresponding command, wherein said command definition file comprises a linkpoint, a keyword, and an argument;
    b) means for extracting a documentation requirement from said syntactic structure wherein said syntactic structure represents documentation content of said command definition file with natural language syntax;
    c) extracting documentation options from said syntactic structure wherein said documentation requirement and said documentation options correspond to a partial fraction of said actual content associated with said command definition file;
    d) means for combining said documentation requirement and any said documentation option into a documentation tag construct wherein said documentation tag construct is embeddable into said command definition file; and
    e) means for automatically generating a template for a documentation content file, wherein said document content file comprises a natural language explanation of said keyword and said argument, wherein said document content file provides a standard framework with automatically generated content and wherein said automatically generated content is end-user over-writable with at least one of documentation content and data of localized relevance to said end-user.

16. The system as recited in claim 15, wherein said command comprises a first command of a plurality of commands and wherein said document content file further comprises a natural language explanation of one or more of:
    a default value relating to said command;
    a usage relating to said command;

a second command of said plurality of commands wherein said second command is related to said first command; and an example relating to said usage, and wherein said system further comprising:

f) means for copying said command definition file into a second command definition file; and g) means for embedding said documentation tag construct into said second command definition file, wherein said documentation tag construct comprises a plurality of documentation tags and wherein one of said documentation tags of said plurality relates to:
   said keyword;
   a string relating to said argument;
   an interface relating to said argument; and
   a number range relating to said argument.

17. The system as recited in claim 15, wherein one or more of said documentation tags of said plurality relates to:
   a documentation collection relating to said purpose;
   a default relating to said command;
   a history relating to said command; and
   an example of said usage, wherein values respectively relating to said default, said history, and said example are accessed from said documentation content file.

18. The system as recited in claim 17, wherein said e) comprises:
   means for examining available fields for fitable values;
   means for choosing a best fit value from among said fitable value;
   means for removing embedded commas;
   means for replacing embedded blanks with separator characters;
   means for selectively reordering denominations;
   means for removing grammatical articles to form a first product; and
   means for surrounding said product by diacritical markers to form a final product.

19. The system as recited in claim 15 further comprising means for converting said documentation content to Hyper Text Markup Language.

* * * * *